US009389768B2

(12) United States Patent
Nonaka et al.

(10) Patent No.: US 9,389,768 B2
(45) Date of Patent: Jul. 12, 2016

(54) REPRODUCER, DIGITAL CAMERA, SLIDE SHOW REPRODUCTION METHOD, PROGRAM, IMAGE DISPLAY APPARATUS, IMAGE DISPLAY METHOD, IMAGE REPRODUCTION METHOD, AND IMAGE DISPLAY PROGRAM

(71) Applicant: Olympus Corporation, Hachioji-shi, Tokyo (JP)

(72) Inventors: Osamu Nonaka, Sagamihara (JP); Kazuhiko Shimura, Hachioji (JP); Tatsuyuki Uemura, Tachikawa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/190,849

(22) Filed: Feb. 26, 2014

(65) Prior Publication Data

US 2014/0176431 A1 Jun. 26, 2014

Related U.S. Application Data

(62) Division of application No. 12/314,294, filed on Dec. 5, 2008, now Pat. No. 8,699,857.

(30) Foreign Application Priority Data

Dec. 6, 2007 (JP) ................................. 2007-316070
Jan. 18, 2008 (JP) ................................. 2008-008775

(51) Int. Cl.
*H04N 5/228* (2006.01)
*G06F 3/0484* (2013.01)
(Continued)

(52) U.S. Cl.
CPC ............ *G06F 3/04847* (2013.01); *G06F 3/017* (2013.01); *G06F 3/0346* (2013.01); *G06F 3/0487* (2013.01); *G11B 27/034* (2013.01); *G11B 27/28* (2013.01);
(Continued)

(58) Field of Classification Search
USPC ................. 348/207.99, 208.99, 208.2, 208.4, 348/208.5, 208.6, 208.7; 386/239, 242, 386/263, 264, 271, 314, 326
See application file for complete search history.

(56) References Cited

U.S. PATENT DOCUMENTS 5,502,484 A * 3/1996 Okada ......................... 348/208.6
5,556,339 A * 9/1996 Cohen ............................. 463/1
(Continued)

FOREIGN PATENT DOCUMENTS

JP         2005005988 A  *  1/2005  ............. H04N 5/225

OTHER PUBLICATIONS

DOI, Masahiro Machine Translation of JP 2005-005988 Photograph Appreciation System 2005.*

*Primary Examiner* — Daquan Zhao
(74) *Attorney, Agent, or Firm* — John C. Pokotylo; Straub & Pokotylo

(57) ABSTRACT

A reproducer is provided with members shown below. Namely, the reproducer is provided with a storage part for storing images, a vibration detection part for detecting a vibration operation by a user, a switching instruction part for instructing switching of reproduction content in slide show reproduction based on a detection result from the vibration detection part, a synthesis processing part for performing creation processing of slide show images, which are images for the slide show reproduction, based on instructions of the switching instruction part, and a slide show control part for performing the slide show reproduction of the images stored in the storage part and the slide show images.

26 Claims, 15 Drawing Sheets

(51) Int. Cl.
*G06F 3/01* (2006.01)
*G06F 3/0346* (2013.01)
*G11B 27/034* (2006.01)
*G11B 27/28* (2006.01)
*H04N 5/232* (2006.01)
*H04N 5/262* (2006.01)
*H04N 5/77* (2006.01)
*G06F 3/0487* (2013.01)
*H04N 5/225* (2006.01)
*G06K 9/00* (2006.01)
*H04N 5/765* (2006.01)
*H04N 9/82* (2006.01)

(52) U.S. Cl.
CPC ...... *H04N 5/23219* (2013.01); *H04N 5/23229* (2013.01); *H04N 5/23248* (2013.01); *H04N 5/23293* (2013.01); *H04N 5/2625* (2013.01); *H04N 5/772* (2013.01); *G06K 9/00221* (2013.01); *H04N 5/765* (2013.01); *H04N 9/8205* (2013.01)

(56) References Cited

U.S. PATENT DOCUMENTS

| | | | | |
|---|---|---|---|---|
| 5,973,733 | A * | 10/1999 | Gove | 348/208.13 |
| 6,122,004 | A * | 9/2000 | Hwang | 348/208.13 |
| 6,487,369 | B1 * | 11/2002 | Sato | 396/52 |
| 7,755,667 | B2 * | 7/2010 | Rabbani et al. | 348/208.6 |
| 2006/0127084 | A1 * | 6/2006 | Okada | 396/439 |
| 2006/0158545 | A1 * | 7/2006 | Hirai | 348/333.01 |
| 2006/0263068 | A1 * | 11/2006 | Jung | 386/112 |
| 2007/0065130 | A1 * | 3/2007 | Fukumoto et al. | 396/55 |
| 2007/0098381 | A1 * | 5/2007 | Oshima | 396/52 |

\* cited by examiner

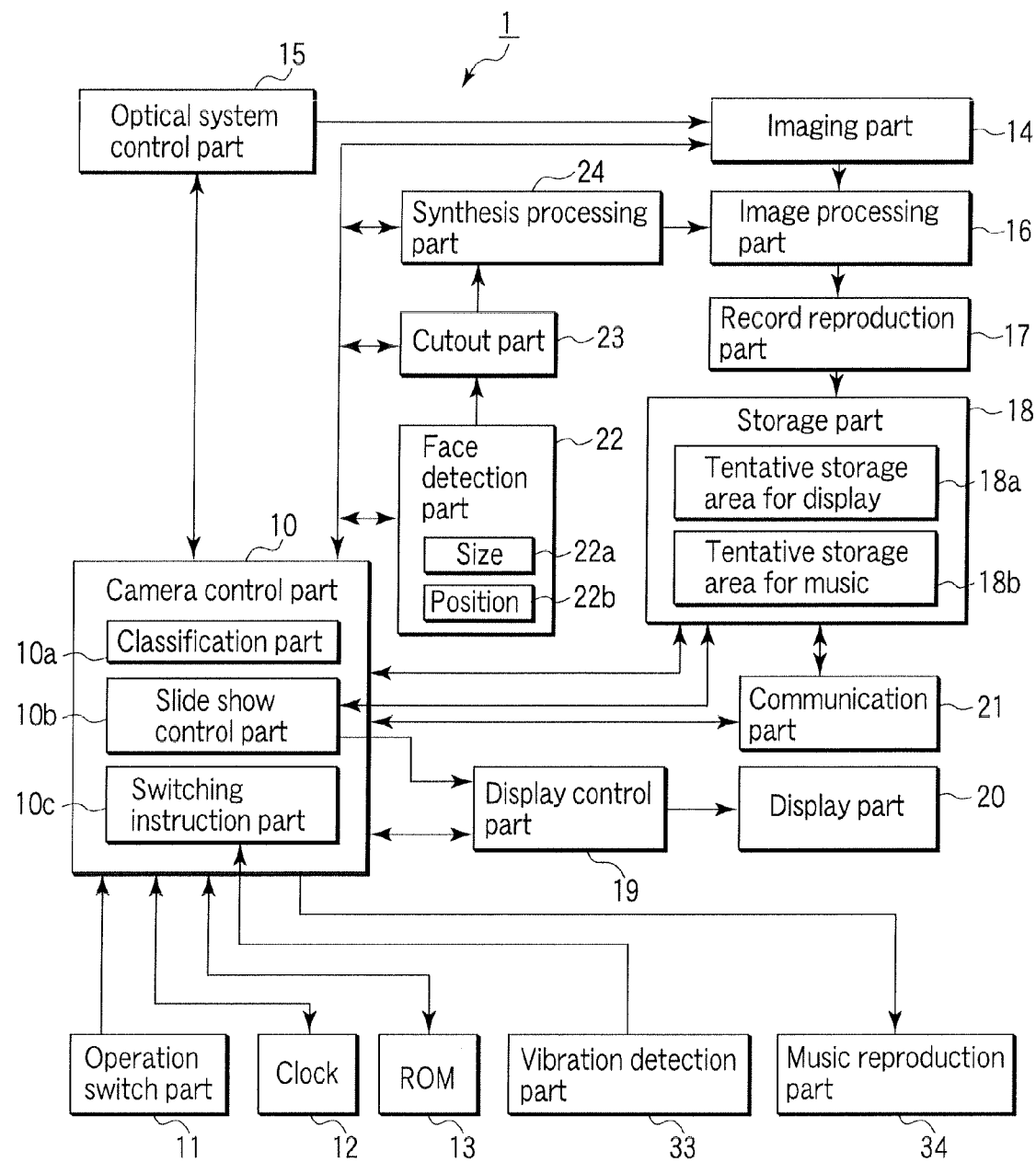
F I G. 1 k=2, k=3 k=2, k=3, k=4 k=1, k=3

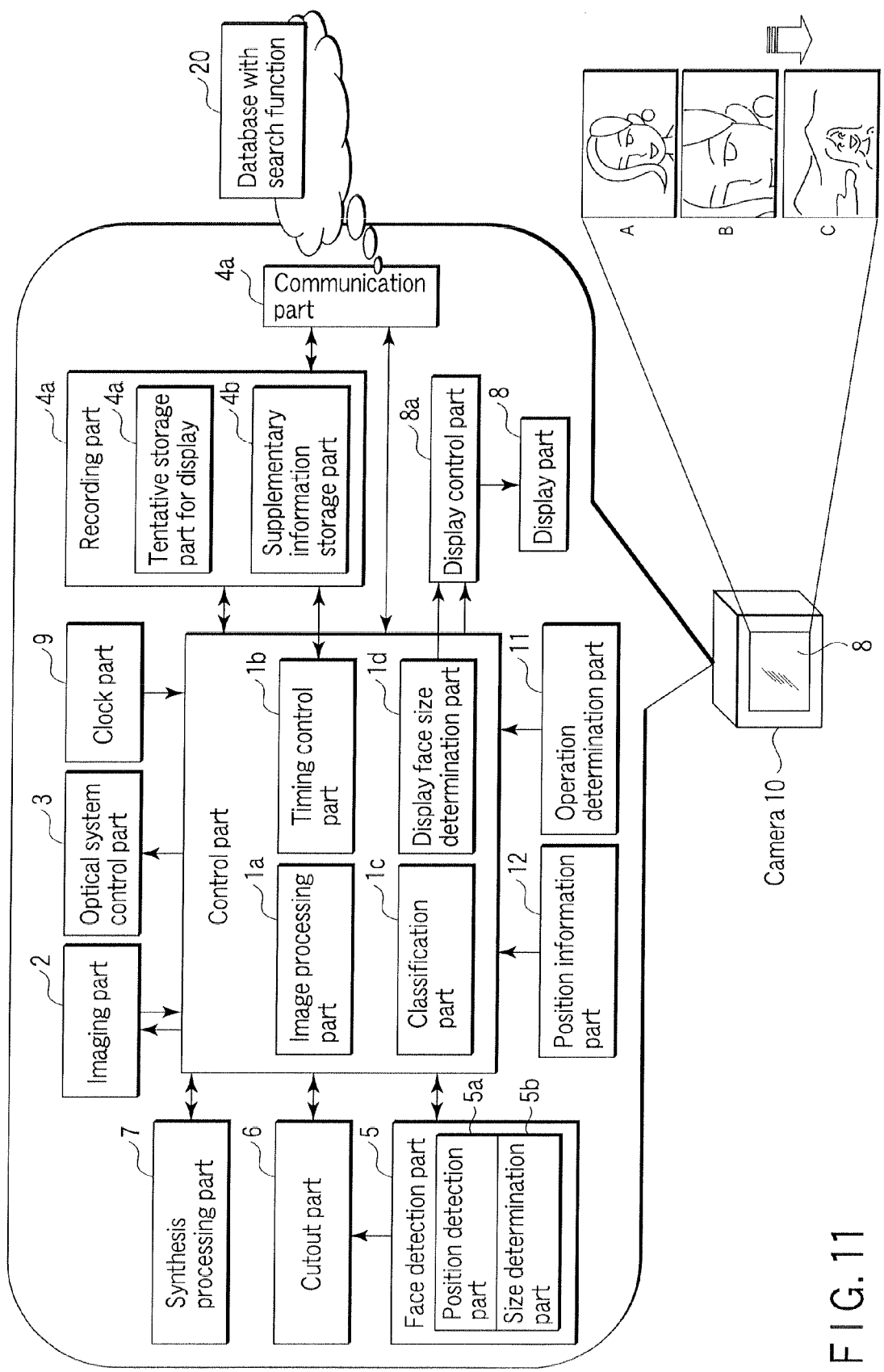
F I G. 11

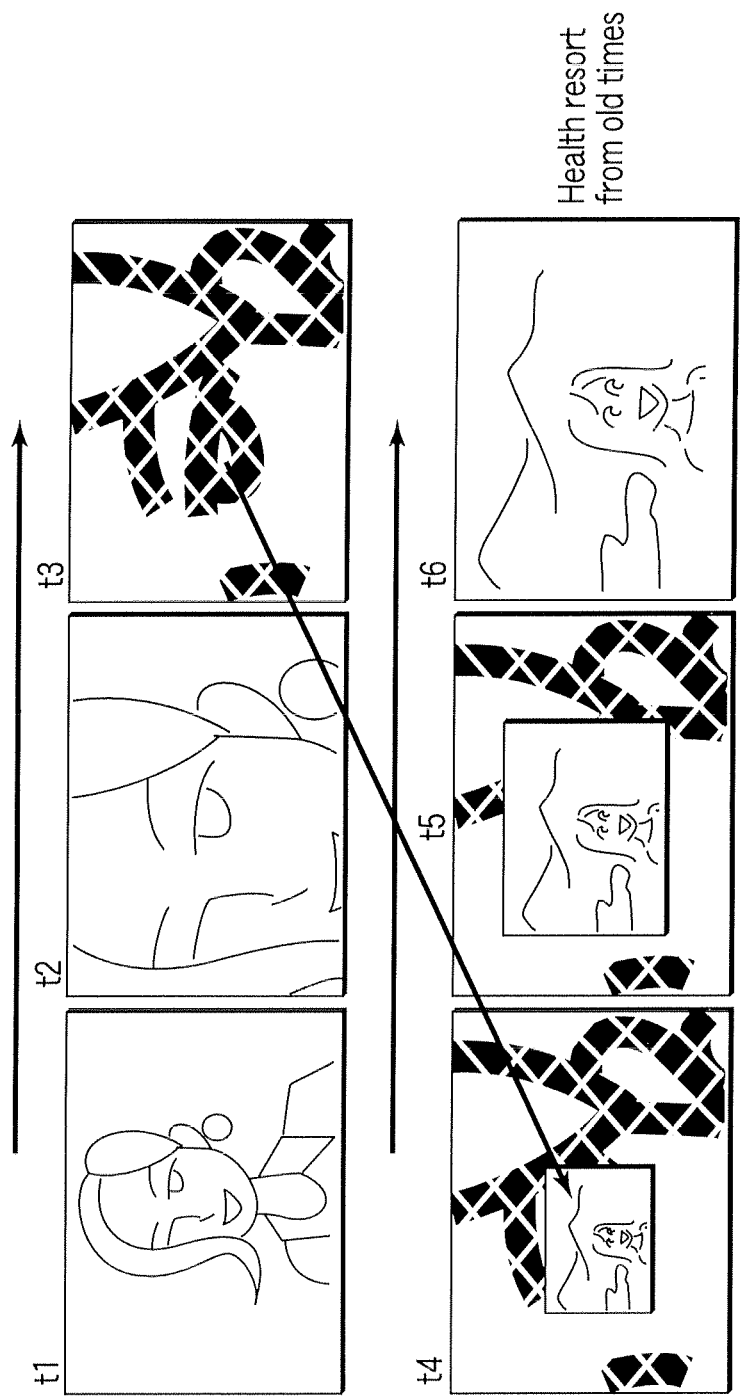
F I G. 12A

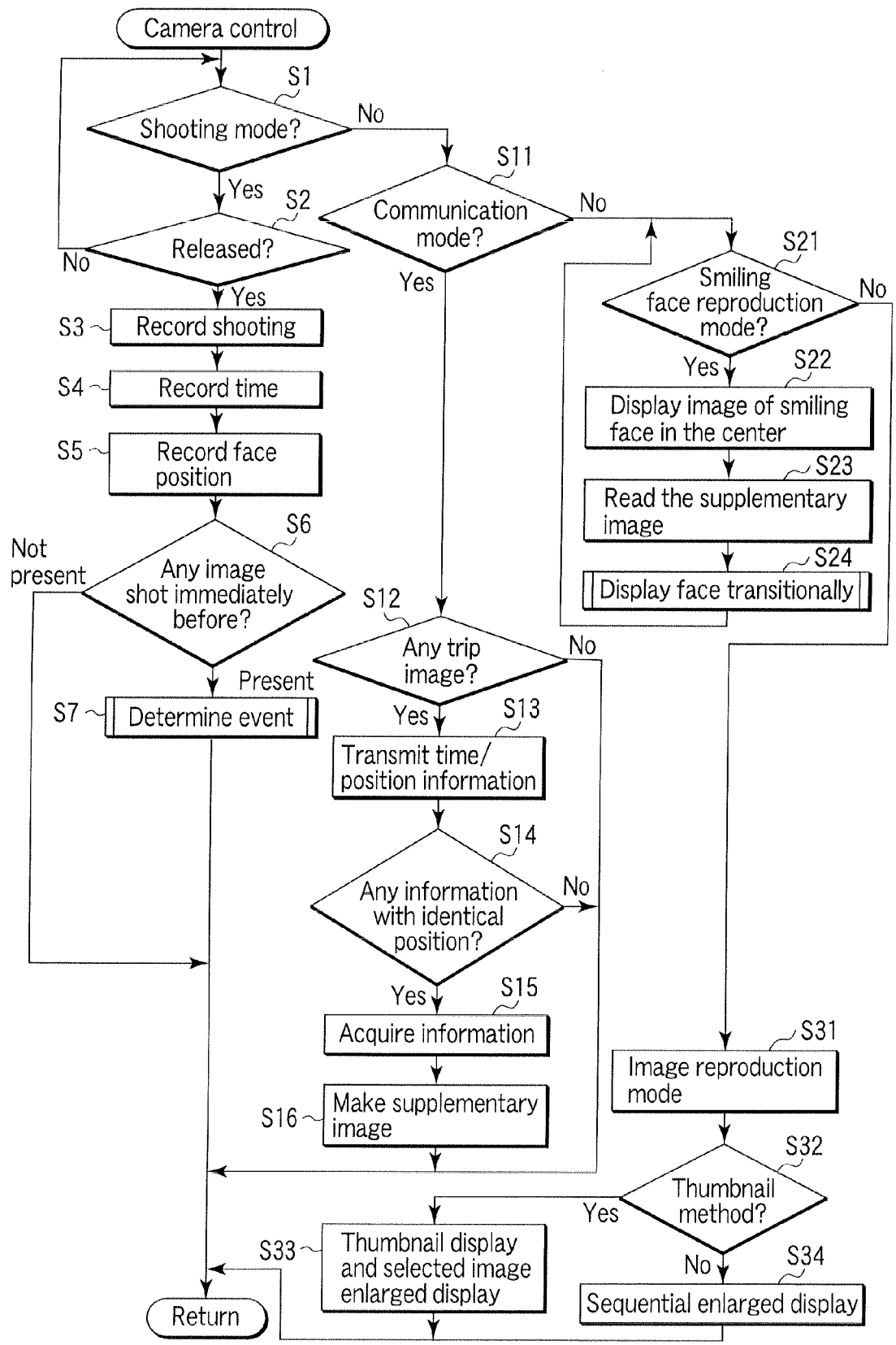
F I G. 14

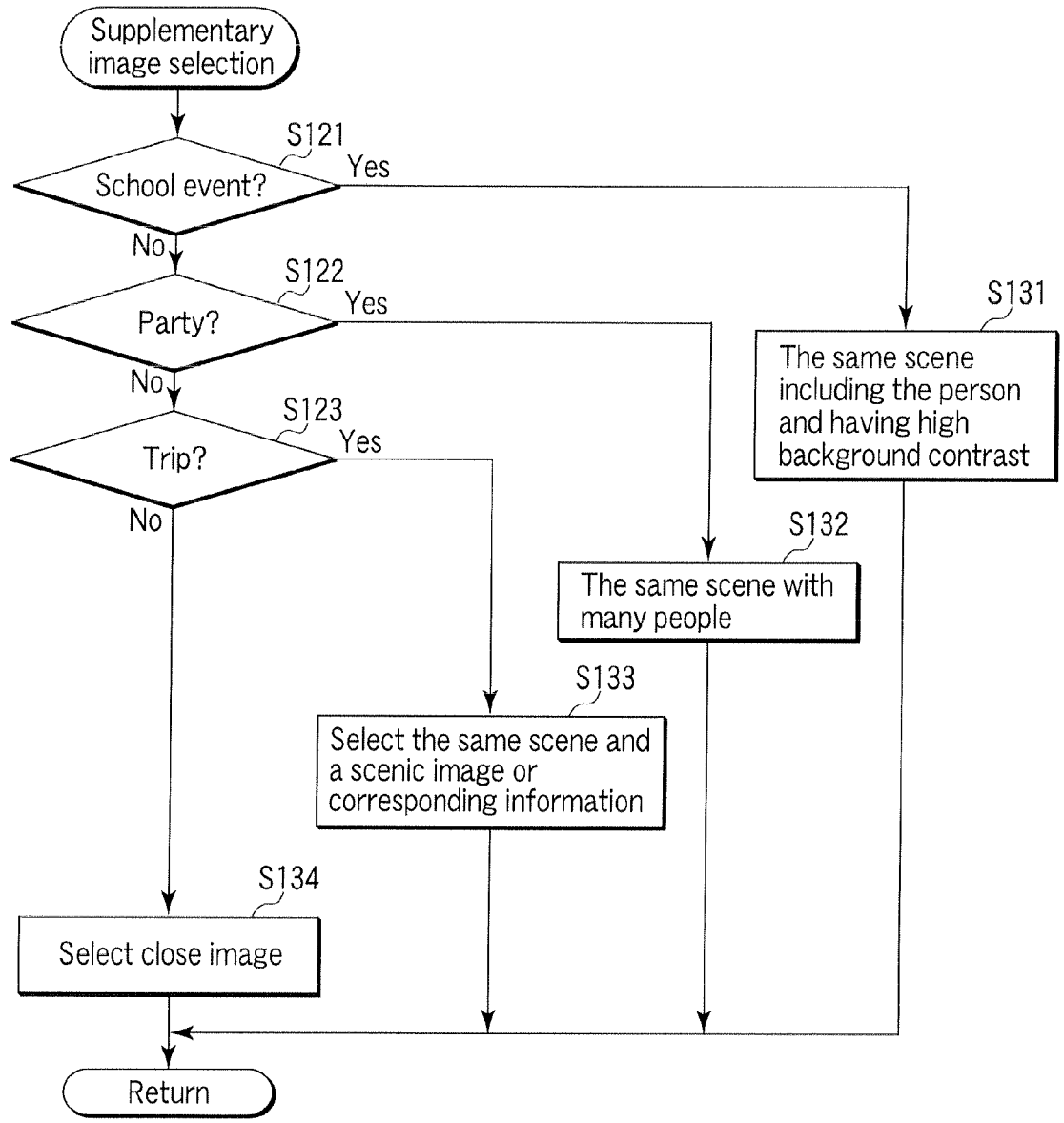
F I G. 16

REPRODUCER, DIGITAL CAMERA, SLIDE SHOW REPRODUCTION METHOD, PROGRAM, IMAGE DISPLAY APPARATUS, IMAGE DISPLAY METHOD, IMAGE REPRODUCTION METHOD, AND IMAGE DISPLAY PROGRAM

RELATED APPLICATIONS

This application is a divisional of U.S. patent application Ser. No. 12/314,294 (referred to as "the '294 application" and incorporated herein by reference), filed on Dec. 5, 2008, titled "REPRODUCER, DIGITAL CAMERA, SLIDE SHOW REPRODUCTION METHOD, PROGRAM, IMAGE DISPLAY APPARATUS, IMAGE DISPLAY METHOD, IMAGE REPRODUCTION METHOD, AND IMAGE DISPLAY PROGRAM," and listing Osamu Nonaka, Kazuhiko Shimura and Tatsuyuki Uemura, as the inventors, the '294 application being based upon and claiming benefit priority to prior Japanese Patent Application No. 2007-316070, filed Dec. 6, 2007, and prior Japanese Patent Application No. 2008-008775, filed Jan. 18, 2008, the entire contents of both of which are incorporated herein by reference.

BACKGROUND OF THE INVENTION

1. Field of the Invention

The present invention relates to a reproducer for reproducing a slide show, a digital camera, a slide show reproduction method, a program, an image display apparatus that effectively switches a plurality of image shots to display the image shots, an image display method, and an image display program.

2. Description of the Related Art

In recent years, with the widespread use of digital cameras, recording media for recording digital data are also growing in capacity, and when compared with the age when film cameras were mainly used, a large quantity of images can now be shot easily.

In view of such circumstances, in addition to a conventional method by which images are printed out as photos and an album of these photos is created to appreciate these photos, various appreciation methods of images acquired by shooting have been proposed.

For example, Jpn. Pat. Appln. KOKAI Publication No. 2004-297424 discloses a digital camera capable of easily reproducing a slide show with sound by combining a plurality of recorded images and sound. In the digital camera disclosed by Jpn. Pat. Appln. KOKAI Publication No. 2004-297424, a still image reproduction means is caused to reproduce still images of a still image file recorded in a memory card to display the reproduced still images in an LCD panel, and still images to be used for a slide show are selected from among a plurality of displayed still images by a still image selection means. On the other hand, a sound reproduction means is caused to reproduce sound of a recorded sound file to insert each of selected still images into a plurality of locations of a sound sequence of the sound file by an insertion means and the LCD panel is caused to display slide show data in which still images are inserted in the sound sequence by a still image sound display means.

The slide show reproduction is an image reproduction method by which a plurality of images are continuously reproduced by switching images in a predetermined time.

Jpn. Pat. Appln. KOKAI Publication No. 2005-5988 discloses a photo appreciation system in which a vibration sensor is provided in a digital camera and the display mode of photos on a display is changed by swinging the digital camera. In the photo appreciation system disclosed by Jpn. Pat. Appln. KOKAI Publication No. 2005-5988, when a digital camera connected to a display means is swung by a user, the display mode of images displayed in the display means changes.

Further, Jpn. Pat. Appln. KOKAI Publication No. 2006-87049 discloses an imaging device that can easily be made to perform a predetermined operation. In the imaging device disclosed by Jpn. Pat. Appln. KOKAI Publication No. 2006-87049, if the posture of the imaging device is different from a posture X, the imaging device checks whether the posture thereof has returned to the posture X within a fixed time. If the imaging device determines that the posture thereof has returned to the posture X within a fixed time, that is, the imaging device is swung, a reproduced image displayed in a display means provided with the imaging device is changed. Accordingly, the display of reproduced images can be forwarded solely by swinging the imaging device without any button operation.

Incidentally, with the technological innovation in digital cameras in recent years, progress has been made in higher sensitivity and expansion of the range of exposure control, and also recording media are growing in capacity. Further, when compared with the age of film cameras, the high-speed consecutive shooting function has markedly improved so that camera users can enjoy shooting in an easygoing fashion to acquire a large quantity of images. Also in recent years, cameras having a function to judge the facial expression of persons who are objects have appeared on the market, making it easier to shoot photos of smiling faces.

Methods of enjoying such a large quantity of photos include the conventional method of printing photos and appreciation of a slide show by a monitor device. Among these methods, the slide show simply displays digital images sequentially in a monitor and may soon become boring. Thus, Jpn. Pat. Appln. KOKAI Publication No. 2005-354333 discloses an image reproducer capable of providing a slide show with variety. In the image reproducer disclosed by Jpn. Pat. Appln. KOKAI Publication No. 2005-354333, an image shot is displayed while a portion in a target range in the image shot is gradually zoomed up so that a slide show is made by giving an impression as if the target range in an image gradually jumps out.

According to an image reproducer disclosed by Jpn. Pat. Appln. KOKAI Publication No. 2005-354333, variety can be given during a slide show.

BRIEF SUMMARY OF THE INVENTION

According to a first aspect of the present invention, there is provided a reproducer for performing slide show reproduction in which a plurality of images is continuously reproduced, comprising: a storage part which stores the images; a vibration detection part which detects a vibration operation of the reproducer by a user; a switching instruction part which instructs switching of reproduction content in the slide show reproduction based on a detection result by the vibration detection part; a synthesis processing part which performs creation processing of slide show images, which are images for the slide show reproduction, based on instructions by the switching instruction part; and a slide show control part which performs the slide show reproduction of the images stored in the storage part and the slide show images.

According to a second aspect of the present invention, there is provided a digital camera having the reproducer according to the first aspect.

According to a third aspect of the present invention, there is provided a slide show reproduction method of a reproducer for performing slide show reproduction in which a plurality of images is continuously reproduced, comprising: a vibration detection step of detecting a vibration operation of the reproducer by a user; a switching instruction step of instructing switching of reproduction content in the slide show reproduction based on a detection result detected in the vibration detection step; a synthesis processing step of performing creation processing of slide show images, which are images for the slide show reproduction, based on switching instructions issued in the switching instruction step; and a slide show reproduction step of performing the slide show reproduction using images including the slide show images.

According to a fourth aspect of the present invention, there is provided a program to cause a computer of a reproducer to perform slide show reproduction in which a plurality of images is continuously reproduced, the program causing the computer to perform: a storage function to store the images; a vibration detection function to detect a vibration operation of the reproducer by a user; a switching instruction function to instruct switching of reproduction content in the slide show reproduction based on a detection result detected by the vibration detection function; a synthesis processing function to perform creation processing of slide show images, which are images for the slide show reproduction, based on switching instructions by the switching instruction function; and a slide show control function to perform the slide show reproduction of the images stored by the storage function and the slide show images.

According to a fifth aspect of the present invention, there is provided an image display apparatus which transitionally displays from a person image to a supplementary image related to the person image, comprising: a display part which displays the person image and the supplementary image; and a display control part which controls a transitional display from a display state of only the person image through a state in which the person image and the supplementary image are simultaneously displayed to the display state of only the supplementary image.

According to a sixth aspect of the present invention, there is provided the image display apparatus according to the fifth aspect, wherein the display control part performs in a process of the transitional display at least one piece of control to display the person image while being gradually enlarged and that to display while contrast of the person image being gradually lowered.

According to a seventh aspect of the present invention, there is provided the image display apparatus according to the fifth aspect, wherein the person image and the supplementary image have substantially equal shooting positions and shooting times.

According to an eighth aspect of the present invention, there is provided the image display apparatus according to the fifth aspect, further comprising an image processing part which classifies the person image, wherein the supplementary image belongs to a classification identical to that of the person image and has a shooting position and a shooting time substantially equal to those of the person image.

According to a ninth aspect of the present invention, there is provided the image display apparatus according to the fifth aspect, wherein the display control part makes an enlarged display centering on a face of a person.

According to a tenth aspect of the present invention, there is provided the image display apparatus according to the fifth aspect, wherein the person image is a person image with a smiling face.

According to an eleventh aspect of the present invention, there is provided the image display apparatus according to the fifth aspect, wherein the display control part changes an enlargement speed in accordance with a size of the person image in the transitional display from the person image to the supplementary image.

According to a twelfth aspect of the present invention, there is provided an image display method of transitionally displaying from a person image to a supplementary image related to the person image, comprising: controlling a transitional display from a display state of only the person image through a state in which the person image and the supplementary image are simultaneously displayed to the display state of only the supplementary image.

According to a thirteenth aspect of the present invention, there is provided a program for image display, comprising: displaying a person image including a person; displaying the person image and a supplementary image simultaneously while causing the person image and the supplementary image to transition; and bringing about a display state of only the supplementary image.

According to a fourteenth aspect of the present invention, there is provided the program for image display according to the thirteenth aspect, comprising: classifying a plurality of image shots according to event prior to displaying the person image; and selecting the supplementary image from among the plurality of image shots in accordance with the event.

According to a fifteenth aspect of the present invention, there is provided the program for image display according to the thirteenth aspect, wherein in order to display the person image and the supplementary image, at least one of an enlarged display of the person image and contrast lowering is done before displaying the person image and the supplementary image simultaneously.

According to a sixteenth aspect of the present invention, there is provided the program for image display according to the fifteenth aspect, wherein an enlargement speed of the enlarged display is changed in accordance with a size of the person image.

According to a seventeenth aspect of the present invention, there is provided an image display apparatus that makes a transitional display from a person image to another image, including a display part for displaying the person image and the other image and a display control part for controlling a transitional display from a display state of only the person image while a face portion of the person image being enlarged and, at this point, at least one of an enlargement speed and contrast being changed in accordance with the size of the face portion.

According to an eighteenth aspect of the present invention, there is provided a reproducer comprising: a storage part which stores images; a vibration detection part which detects a vibration operation of the reproducer by a user; and an image processing part which performs predetermined image processing on the images in accordance with a vibration detection result by the vibration detection part.

According to a nineteenth aspect of the present invention, there is provided a reproducer comprising: a storage part which stores images; and an image processing part which performs predetermined image processing on the images in accordance with imaging content concerning the images.

According to a twentieth aspect of the present invention, there is provided a reproducer comprising: a display control part which sequentially displays a plurality of images; and a display switching part which switches images sequentially displayed by the display control part in accordance with at least one of a vibration operation of the reproducer by a user and imaging content concerning the images.

According to a twenty-first aspect of the present invention, there is provided an image display apparatus which sequentially reproduces and displays a plurality of pieces of image shot data, comprising: a face part determination part which determines whether or not a face part of a person is included on objects of the image shot data; and a display control part which, when image shot data determined by the face part determination part to include a face part is reproduced and displayed, displays the face part while the face part being enlarged and, when the enlarged display is completed, switches the display to that of related image data related to the image shot data.

According to a twenty-second aspect of the present invention, there is provided a reproducer which performs slide show reproduction in which a plurality of pieces of image data is sequentially and continuously reproduced, comprising: a storage part which stores the image data; a vibration detection part which detects a vibration operation of the reproducer by a user; and a switching instruction part which switches a display image switching speed in the slide show reproduction based on a detection result by the vibration detection part.

According to a twenty-third aspect of the present invention, there is provided a reproducer which continuously reproduces and displays a plurality of pieces of image shot data, comprising: an event determination part which determines an event concerning the image shot data; an event classification part which classifies the image shot data based on a determination result by the event determination part; and a display control part which selects and continuously reproduces and displays image shot data acquired in an identical event based on a classification result by the event classification part.

According to a twenty-fourth aspect of the present invention, there is provided a reproducer which continuously reproduces and displays a plurality of pieces of image shot data, comprising: an event determination part which determines an event concerning the image shot data; an event classification part which classifies the image shot data based on a determination result by the event determination part; and a display control part which selects a plurality of pieces of image shot data acquired in an identical event based on a classification result by the event classification part and performs synthesis processing on the plurality of pieces of image shot data before reproduction and display.

According to a twenty-fifth aspect of the present invention, there is provided an image reproduction method of continuously reproducing and displaying a plurality of pieces of image shot data, comprising: an event determination step of determining an event concerning the image shot data; an event classification step of classifying the image shot data based on a determination result in the event determination step; and a display control step of selecting and continuously reproducing and displaying image shot data acquired in an identical event based on a classification result in the event classification step.

According to a twenty-sixth aspect of the present invention, there is provided an image reproduction method of continuously reproducing and displaying a plurality of pieces of image shot data, comprising: an event determination step of determining an event concerning the image shot data; an event classification step of classifying the image shot data based on a determination result in the event determination step; and a display control step of selecting a plurality of pieces of image shot data acquired in an identical event based on a classification result in the event classification step and performing synthesis processing on the plurality of pieces of image shot data before reproduction and display.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a digital camera according to a first embodiment of the present invention;

FIG. 11 is a block diagram showing the configuration of a camera according to a second embodiment of the present invention and peripherals thereof;

FIG. 12A is a diagram showing a basic method of reproducing camera images in the second embodiment of the present invention and a diagram showing a basic method of reproducing image shots while on a trip;

FIG. 14 is a diagram showing the flow chart showing an operation of camera control in the camera according to the second embodiment of the present invention;

FIG. 16 is a diagram showing the flow chart showing the operation of auxiliary image selection in the camera according to the second embodiment of the present invention.

DETAILED DESCRIPTION OF THE INVENTION

Figure 2:
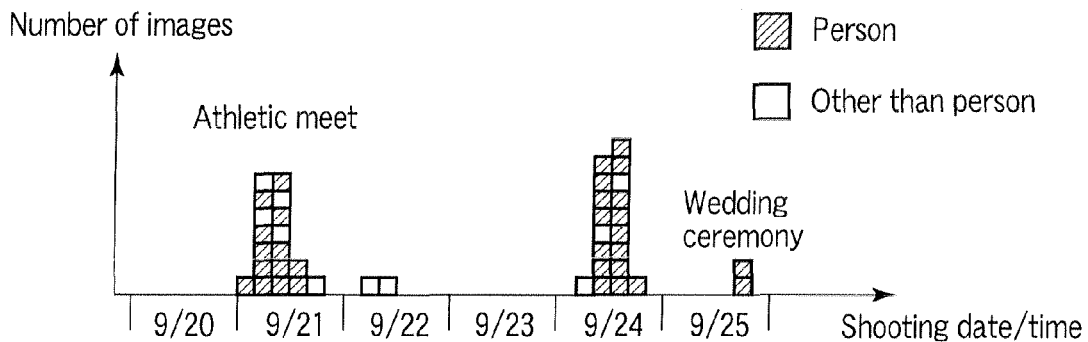
FIG. 2 is a diagram shows an example of a graph in which the horizontal axis shows the date/time of shooting and the vertical axis shows the number of pieces of image data acquired by shooting.

Embodiments of the present invention will be described below with reference to the drawings.

First Embodiment

FIG. 1 is a block diagram showing the configuration of a digital camera according to the first embodiment of the present invention. As shown in FIG. 1, a digital camera 1 has a camera control part 10, an operation switch part 11, a clock part 12, a ROM 13, an imaging part 14, an optical system control part 15, an image processing part 16, a record reproduction part 17, a storage part 18, a display control part 19, a display part 20, a communication part 21, a face detection part 22, a cutout part 23, a synthesis processing part 24, a vibration detection part 33, and a music reproduction part 34.

The camera control part 10 centrally controls the whole camera based on a program stored in the ROM 13. However, for convenience of description, the camera control part 10 is assumed here to have a classification part 10a for performing classification processing (details will be provided later), a slide show control part 10b for performing slide show reproduction control processing (details will be provided later), and a switching instruction part 10c for performing switching instruction processing (details will be provided later) for a description that follows.

More specifically, the classification part 10a determines an event or the like in which image data is shot based on the shooting date/time and the like of the image data and then performs classification processing of the image data concerning the shooting based on a result of the determination when the image data is recorded in the storage part 18.

The slide show control part 10b exercises slide show reproduction control such as image data and music data switching by controlling the storage part 18, the image processing part 16, the display control part 19 and the like when slide show reproduction is instructed.

The switching instruction part 10c determines, based on a detection result notified from the vibration detection part 33 described later, switching operation content by a user by calculating the number of times k the relevant digital camera was operated by vibration (swung) and the vibration time tk and provides instructions to switch image data to the slide show control part 10b based on a result of the determination.

The operation switch part 11 is connected to the camera control part 10 and detects instructions of the operation switch part 11 by a user to provide instructions to the camera control part 10.

The clock part 12 is connected to the camera control part 10 and outputs date/time data obtained by counting the date/time to the camera control part 10.

The ROM 13 is connected to the camera control part 10 and stores the program used by the camera control part 10 to centrally control the whole camera.

The imaging part 14 has at least an optical part containing an imaging lens for forming an object image, an image sensor for performing photoelectric conversion of an optical image, and an imaging processing part for generating and outputting image data by processing an electric signal output from the image sensor.

The optical system control part 15 drives lenses and a shutter inside the optical part of the imaging part 14 following instructions from the camera control part 10.

The image processing part 16 performs various kinds of image processing such as color processing and gamma processing on image data. The image processing part 16 further has a compressing expanding part, and compression processing is performed on image data after image processing is performed by the compressing expanding part during shooting, and image processing such as expansion processing is performed on compressed image data during reproduction.

The record reproduction part 17 records image data compressed by the image processing part 16 in the storage part 18 when images are shot and reads predetermined image data compressed by the image processing part 16 from the storage part 18 when images are reproduced.

The storage part 18 has, in addition to an area to store normal image data, music data and the like, a tentative storage area for display 18a for tentatively storing image data acquired by shooting and image data for slide show reproduction generated after image processing by the synthesis processing part 24 and the image processing part 16, and a tentative storage area for music 18b for storing music data of BGM and the like used for slide show reproduction.

The display control part 19 causes the display part 20 to display a monitor image, which is a display image generated through image processing by the image processing part 16, during shooting. The display control part 19 also causes the display part 20 to display an image after being read from the storage part 18 and expansion processing thereof being performed by the image processing part 16 during image reproduction.

The communication part 21 is an interface for transmitting and receiving data such as image data and music data to/from external devices such as external PCs and servers that can perform communication via a network.

The face detection part 22 has a position detection part 22b for detecting, for example, the position of a face part of a person or the like in an image shot displayed in the display part 20 during shooting or image data acquired by shooting and a size detection part 20a for detecting the size of the face part whose position is detected by the position detection part 22b. The face detection part 22 detects information about the face part of an object in this manner.

Here, information about the face part such as presence/absence thereof and the size and position thereof in an image shot or the like detected by the face detection part 22 is stored to the storage part 18 as a file together with clock information when the relevant image data is stored. The information about the face part is used when image data is classified.

Information about the position of the face part detected by the face detection part 22 can also be used for exposure or focusing during shooting.

The cutout part 23 performs processing to cut out a face portion from image data based on information about the face part detected by the face detection part 22.

The synthesis processing part 24 generates an image of the face part that is different from an image of the original face part by performing enlargement or reduction processing of the face part cut out by the cutout part 23, 4-scene synthesis processing and the like. Such an image is also called a slide show secondary image below.

The cutout part 23 and the synthesis processing part 24 perform the above processing based on instructions from the slide show control part 10*b*.

The vibration detection part 33 has a vibration sensor (not shown) and detects the state of a vibration operation of the relevant digital camera by a user through the vibration sensor to notify the switching instruction part 10*c* of a result of the detection.

The music reproduction part 34 reproduces music stored in the tentative storage area for music 18*b* to coincide with a reproduction of image data based on instructions of the slide show control part 10*b*.

The slide show reproduction, which is one of main features of a digital camera according to the first embodiment, will be described below.

FIG. 2 is a graph in which the horizontal axis shows the date/time of shooting and the vertical axis shows the number of pieces of image data acquired by shooting. That is, the graph shown in FIG. 2 is an example of a graph showing fluctuations in frequency of shooting.

In FIG. 2, a day is divided into six time zones (called the first time zone, the second time zone, and the sixth time zone) and the number of pieces of image data acquired by shooting in each time zone is represented by squares, each square corresponding to one image.

Further, in FIG. 2, image data in which the main object is a person (hereinafter, referred to as portrait image data) and that in which the main object is other than persons (hereinafter, referred to as general image data) are distinguished. That is, squares with oblique hatching indicate the portrait image data and white squares indicate the general image data.

In the example shown in FIG. 2, an athletic meet took place on September 21 and a wedding ceremony on September 25 as events and the number of pieces of image data acquired by shooting on September 20 is 0 and that acquired by shooting on September 21 is 18.

More specifically, the breakdown of image data acquired by shooting on September 21 is as follows: one piece of portrait image data in the first time zone, five pieces of portrait image data and two pieces of general image data in the second time zone, five pieces of portrait image data and two pieces of general image data in the third time zone, two pieces of portrait image data in the fourth time zone, and one piece of general image data in the fifth time zone.

Thus, for a general user, the number of pieces of image data acquired by shooting fluctuates sharply depending on the date/time of shooting. Since such fluctuations in the number of image shots usually have certain patterns, it becomes possible to determine in which event image data acquired by shooting is shot with a certain degree of precision.

Figure 3:
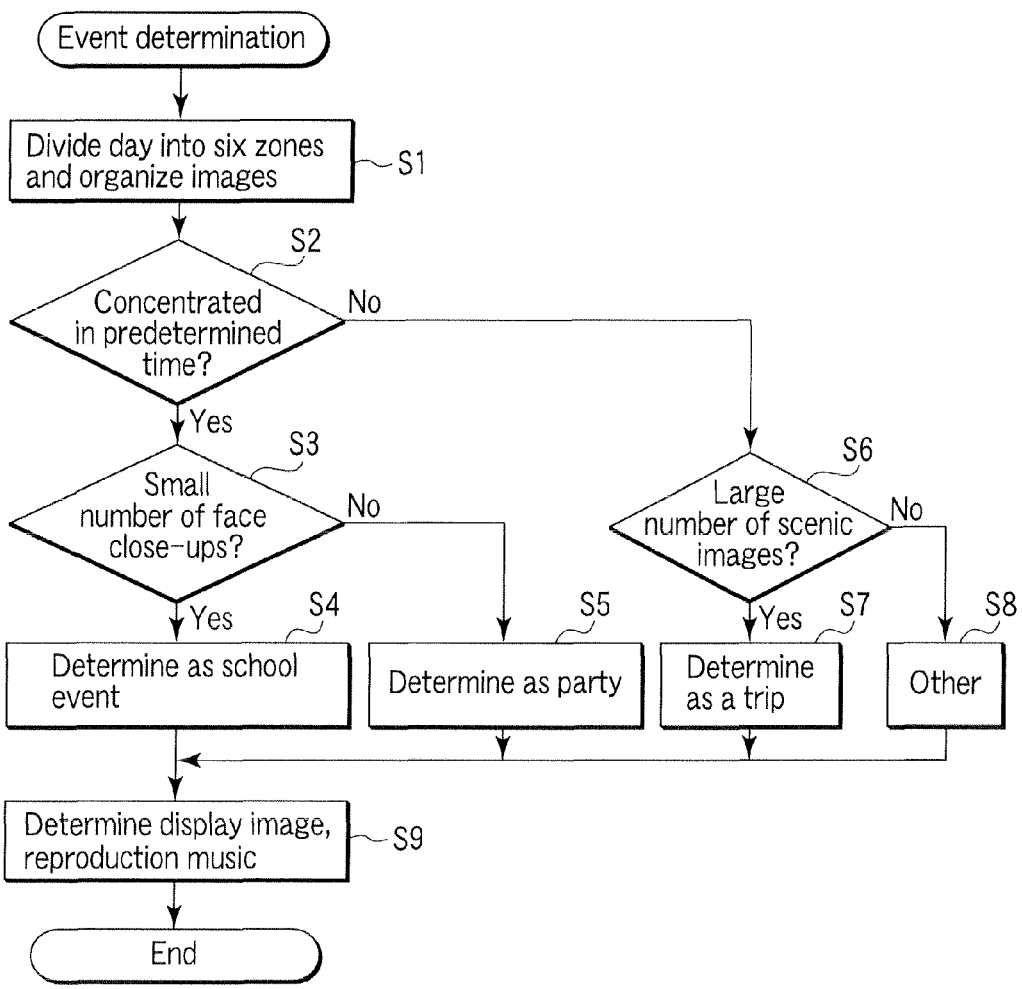
FIG. 3 is a diagram showing a flow chart of processing by a control part of the camera that automatically determines music data to be reproduced simultaneously when image data is reproduced as a slide show.

Then, by determining an event in which image data was shot, music data appropriate for simultaneous reproduction when image data is reproduced as a slide show can automatically be determined. FIG. 3 is a diagram showing a flow chart of processing by the camera control part 10 (mainly the classification part 10*a*) that automatically determines music data to be reproduced simultaneously when image data is reproduced as a slide show.

Here, for convenience of description, processing to determine an event in units of days will be described, but the unit need not be a day and an event may be determined in units shorter or longer.

First, the classification part 10*a* classifies image data stored in the storage part 18 into the first time zone to the sixth time zone based on the shooting time of the image data (step S1).

Subsequently, the classification part 10*a* determines whether or not image data classified at step S1 for a predetermined date is concentrated in one of the first time zone to the sixth time zone (step S2). This determination is a determination using the fact that the number of times of shooting tends to be distributed in each time zone of a day when, for example, on a trip.

If branched to YES at step 2, the classification part 10*a* determines whether or not the ratio of image data in which close-ups of the face part are taken is smaller than a predetermined ratio (step S3). If branched to YES at step 3, the event in which the image data was shot is determined to be a "school event" such as an athletic meet (step S4). On the other hand, if branched to NO at step 3, the classification part 10*a* determines the event in which the image data was shot to be a "party" (step S5).

Incidentally, if branched to NO at step 2, the classification part 10*a* determines whether or not the ratio of image data in which scenery is taken is larger than a predetermined ratio (step S6). If branched to YES at step 6, the classification part 10*a* determines the event in which the image data was shot to be a "trip" (step S7). On the other hand, if branched to NO at step 6, the classification part 10*a* determines the image data to be "other" image data (step S8).

When processing at step S4, step S5, step S7, or step S8 is completed, the classification part 10*a* selects and decides, based on the determined event described above, music data appropriate for the event from music data stored in the storage part 18 (step S9).

The event determination processing described with reference to FIG. 3 may automatically be performed at a suitable timing after shooting or may be performed after being instructed by a user.

With the processing described above, an event in which image data was shot is determined based on the image data acquired by shooting so that music data appropriate for the event can be selected and decided.

Figure 4:
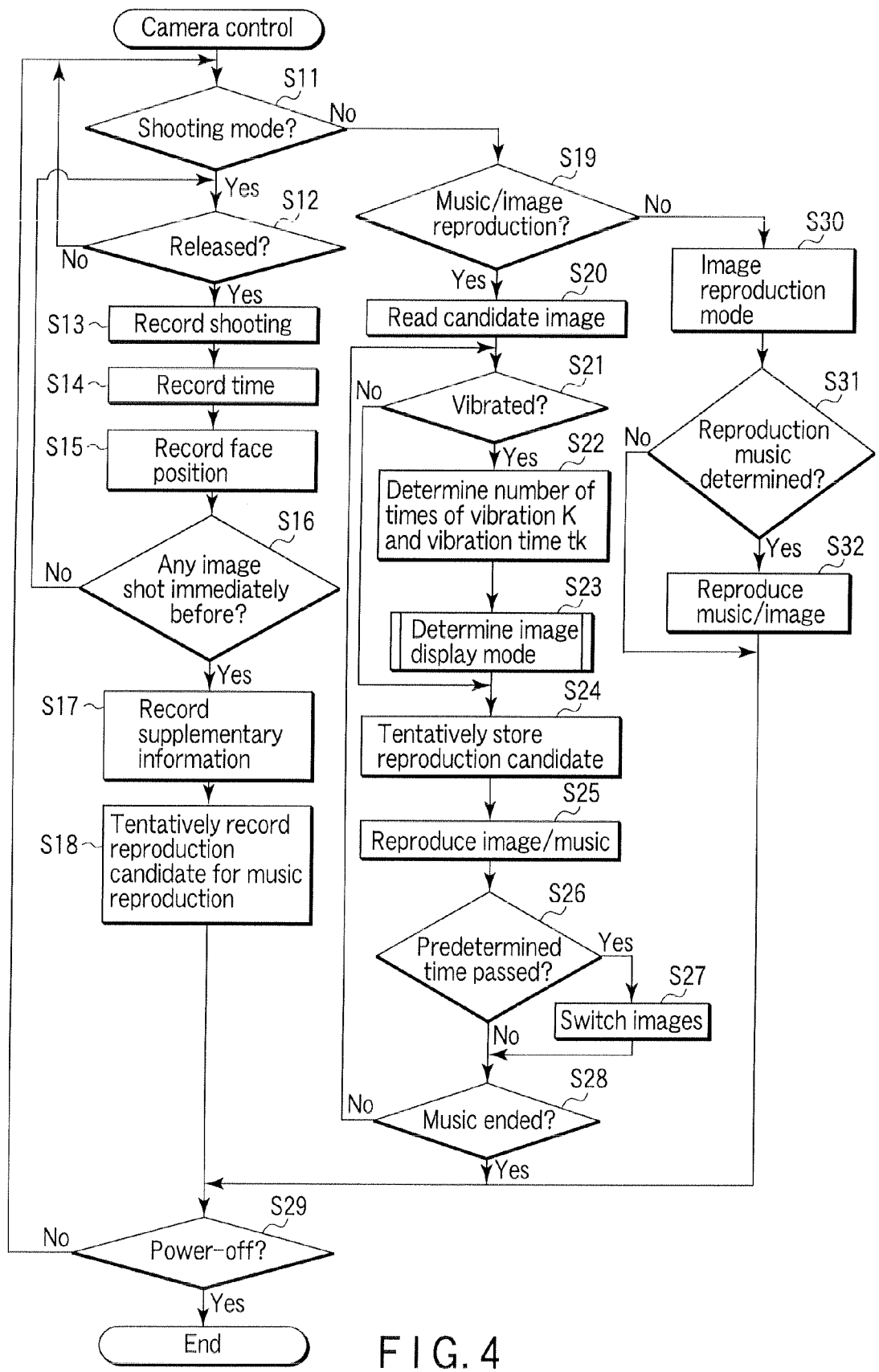
FIG. 4 is a diagram showing the flow chart of processing by the control part of the camera regarding shooting control and reproduction control of the digital camera according to the first embodiment of the present invention.

FIG. 4 is a diagram showing the flow chart of processing by the camera control part 10 regarding shooting control and reproduction control of the digital camera 1 according to the first embodiment.

First, the camera control part 10 determines whether or not the digital camera is set to the shooting mode (step S11). If branched to YES at step 11, the camera control part 10 determines whether or not a release operation is performed by a user (step S12). If branched to NO at step 12, processing returns to step S11. That is, step S12 is a step to wait until a release operation is performed by the user.

On the other hand, if branched to YES at step 12, the camera control part 10 records image data shot and acquired by a release operation of the user in the storage part 18 (step S13). Subsequently, the record reproduction part 17 records the shooting time of the image data in the storage part 18 by association with the image data (step S14). Further, the record reproduction part 17 records the position of a face part detected by the face detection part 22 in the storage part 18 by association with the image data (step S15).

Further, the camera control part 10 determines whether or not image data (hereinafter, referred to as preceding image data) shot immediately before (for example, within 10 minutes) the image data is present (step S16). If branched to YES at step 16, the camera control part 10 estimates that the image data belongs to the same image group as the preceding image data and collaterally records supplementary information of "related to the preceding image data" to the image data (step S17). The supplementary information is used when image data is classified for a slide show reproduction. On the other hand, if branched to NO at step 16, processing returns to step S12.

If supplementary information showing association between image data is present, as described above, grouping of image data for a slide show reproduction described later is made easier. Also, when image data is reproduced as a slide show, users can obtain more amusement by reproducing image data belonging to one classified group rather than reproducing all the image data stored in the storage part 18 because the image data concerns one theme.

Moreover, by selecting image data belonging to one group for reproduction, an unexpected situation in which, for example, when a plurality of pieces of image data shot together with fellow workers is reproduced as a slide show, suddenly image data concerning a private matter of a user slips in and is reproduced, which would spoil the fun, can be prevented.

If supplementary information showing association between image data as described above is collaterally recorded in image data, the camera can be used as a communication tool by, for example, reproducing image data immediately after shooting for appreciation or performing synthesis processing without performing processing for group classification.

After the processing at step S17 is completed, the camera control part 10 further performs event determination processing described with reference to the flow chart shown in FIG. 3 and determines music data to be reproduced when the image data is reproduced as a slide show to record a file name and the like of the music data in the storage part 18 (step S18). The processing of step S18, however, may naturally be made to be performed manually by a user, for example, before image data is reproduced as a slide show, instead of being automatically performed.

When processing at step S18 is completed, whether or not an operation to turn off the digital camera 1 is performed is determined (step S29). If branched to NO at step 29, processing returns to step S11. On the other hand, if branched to YES at step 29, the processing is terminated by turning off the digital camera 1.

Incidentally, if branched to NO at step 11, the camera control part 10 determines whether or not the digital camera 1 is set to the "music/image reproduction mode" by an operation of the user (step S19). If branched to NO at step S19, the camera control part 10 sets the digital camera 1 to the "image reproduction mode" to perform reproduction or slide show reproduction of images only not accompanied by reproduction of music data (step S30).

Then, whether or not a reproduction operation of predetermined music data is performed by the user is determined (step S31). If branched to NO at step S31, processing in "image reproduction mode" is continued.

On the other hand, if branched to YES at step S31, the camera control part 10 performs reproduction processing of music data selected by the user and image data (step S32).

If branched to YES at step S19, the camera control part 10 reads image data belonging to the event determined by the event determination processing described with reference to the flow chart shown in FIG. 3 or that on which event determination processing is performed by an operation of the user and selected by the user as reproduction candidate images for slide show reproduction from the storage part 18 (step S20). Subsequently, the switching instruction part 10*c* determines whether or not a vibration operation of the camera is performed by the user (step S21).

If branched to YES at step S21, the camera control part 10 determines the number of times of vibration K and the vibration time tk of the vibration operation based on output from the vibration detection part 33 (step S22). Then, based on a result of the determination, the camera control part 10 decides the display mode which the display part 20 is caused to display for reproduction by processing shown in the flow chart of a subroutine shown in FIG. 5 (step S23).

The decision processing of the display mode will be described below with reference to the flow chart shown in FIG. 5. For convenience of description, it is assumed that the number of reproduction candidate images for slide show reproduction (number of pieces of image data concerning slide show reproduction) m is m=4 and the relevant image data is abbreviated simply as a, b, c, and d in sequence of the date/time of the shooting. Here, it is assumed that a and c are images (hereinafter, referred to as faces images) whose main object is a face part. A group of image data such as a, b, c, and d will be called an image row.

Figure 6:
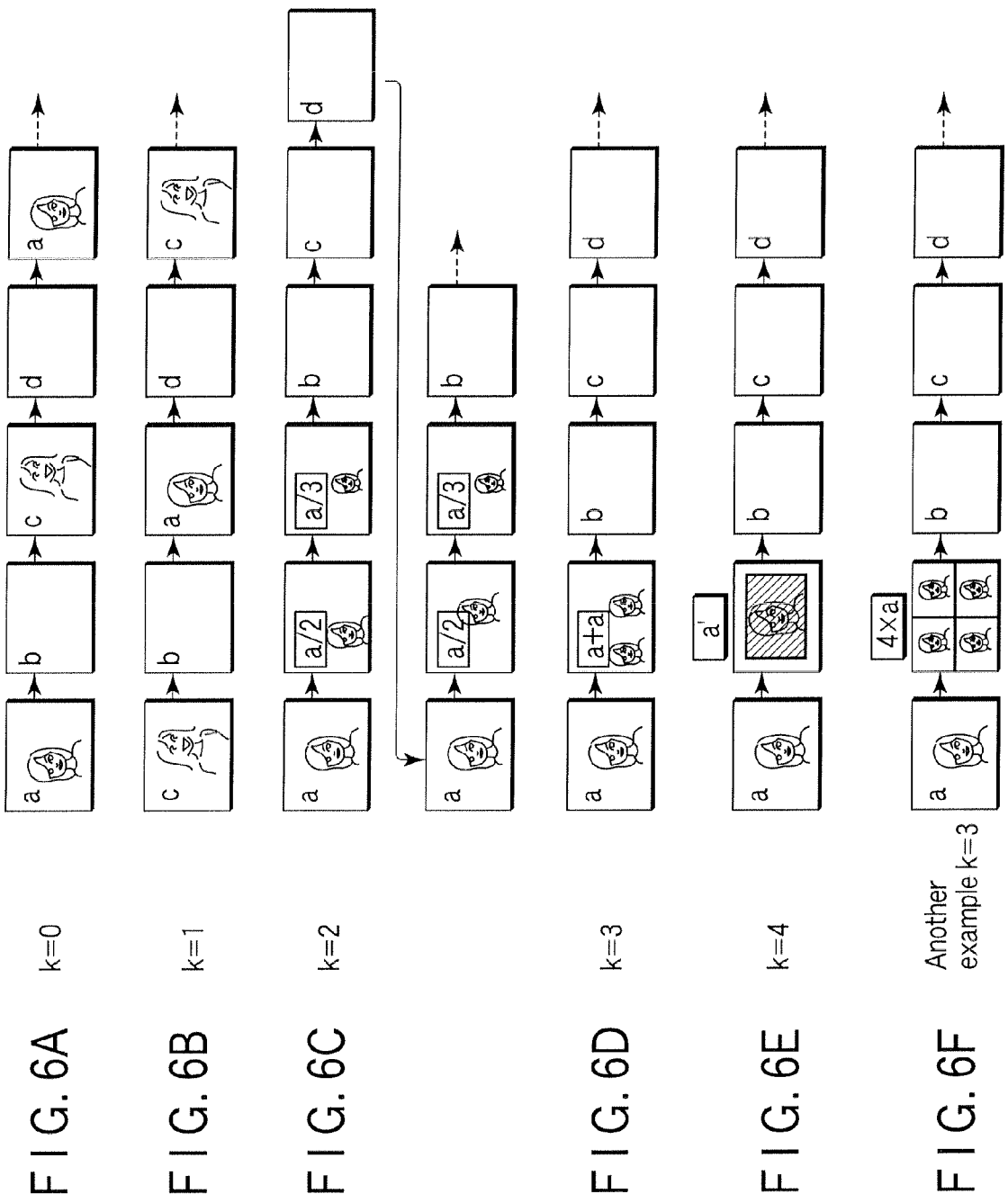
FIG. 6A is a diagram showing an example of the display of slide show reproduction.
FIG. 6B is a diagram showing an example of the display of slide show reproduction.
FIG. 6C is a diagram showing an example of the display of slide show reproduction.
FIG. 6D is a diagram showing an example of the display of slide show reproduction.
FIG. 6E is a diagram showing an example of the display of slide show reproduction.
FIG. 6F is a diagram showing an example of the display of slide show reproduction.

If there is no vibration operation of the camera (number of times of vibration K=0), the camera control part 10 reproduces the image data as a normal slide show and, as shown in FIG. 6A, repeatedly reproduces the image data as a slide show simply in the order of a→b→c→d→a . . . .

First, the number of reproduction candidate images for slide show reproduction is set as m (step S41). Subsequently, whether or not the number of times of vibration K=1 is determined (step S42). If branched to YES at step S42, as shown in FIG. 6B, the order of reproduction of image data is randomly interchanged (step S45).

FIG. 6B shows an example of the random interchange. In the example shown in FIG. 6B, a change of interchanging the order of reproduction of a and c is made so that the order of reproduction becomes c→b→a→d→c . . . . At step S45, the order of reproduction needs only to be randomly changed and with this processing, variety can easily be given to the display mode of slide show reproduction.

If branched to NO at step S41, whether or not the vibration time tk>5 (sec) is determined (step S43). If branched to NO at step S43, whether or not the first image data and the second image data in the order of reproduction of the reproduction candidate image data are image data on which image processing at step S46 or step S47 is not performed and having a face part as the main object (step S44). If branched to NO at step S44, processing of "first one-image processing mode (mode in which synthesis processing is performed only on the first image)" is performed (step S46).

In the example shown in FIG. 6A, while a is image data of a face, b is not so that branching to NO occurs at step S44.

Figure 7:
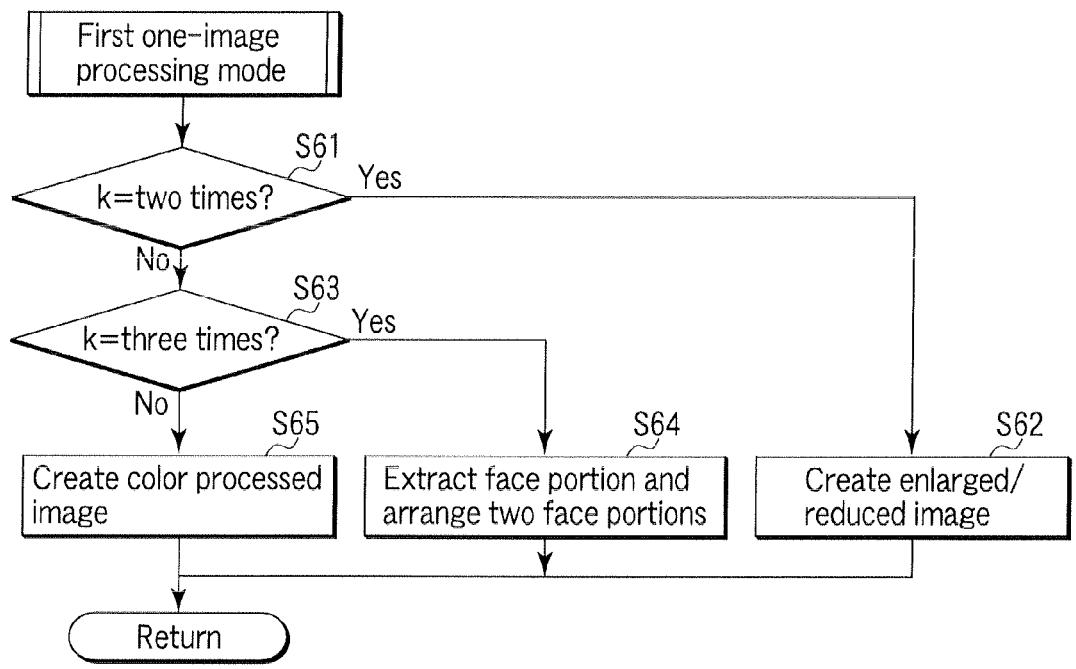
FIG. 7 is a diagram showing the flow chart of processing in first one-image processing mode.

A subroutine of the "first one-image processing mode" at step S46 will be described below with reference to the flow chart shown in FIG. 7. That is, the camera control part 10 first determines whether or not the number of times of vibration K=2 in "first one-image processing mode" (step S61). If branched to YES at step S61, enlargement processing or reduction processing of the first image a is performed to create an enlarged image or a reduced image (step S62). Image processing at step S62 is performed by the switching instruction part 10c, the face detection part 22, the cutout part 23, and the synthesis processing part 24 under control of the camera control part 10.

Here, FIG. 6C is a diagram showing a display example of slide show reproduction of an image created at step S62. Here, images in which the symbol (a or b) indicating each image is encircled by a rectangle in the display example are images on which image processing has been performed at step S46 or step S47. Therefore, images in which the symbol (a or b) indicating each image is not encircled by a rectangle in the display example are images on which image processing has not been performed at step S46 or step S47. Images (a/2, a/3) synthesized for a slide show in this manner are slide show secondary images.

Symbols indicating each image and graphics encircling such symbols are attached for convenience of description and are not displayed in actual slide show reproduction.

In the example shown in FIG. 6C, a ½ reduced image (called a/2) and a ⅓ reduced image (called a/3) of the first image a are created and these reduced images are made to successively display after a. That is, the slide show reproduction is performed repeatedly in the order of a→a/2→a/3→b→c→d→a→a/2 . . . .

While an example in which reduced images are created and made to display is shown here, enlarged images may be created and similarly made to display. Moreover, any reduction ratio or enlargement ratio can be set.

Incidentally, if branched to NO at step S61, whether or not the number of times of vibration K=3 is determined (step S63). If branched to YES at step S63, a synthesized image (called (a+a)) in which two face parts arranged side by side of the face part in the first image a is created (step S64).

FIG. 6D is a diagram showing a display example of the synthesized image created at step S64. In the example shown in FIG. 6D, the second image in the order of reproduction shows the synthesized image (a+a) created at step S64. Then, when the slide show reproduction is performed, for example, as shown in FIG. 6D, the slide show reproduction is performed repeatedly in the order of a→(a+a)→b→c→d→a→(a+a) . . . .

At step S64, for example, as shown in FIG. 6F, a synthesized image (called (a×4)) in which four face parts arranged side by side of the face part in the first image a may also be created and there is no limit to the number of face parts to be arranged.

On the other hand, if branched to NO at step S63, an image (called a') obtained by performing color processing (for example, tone reversal or sepia toning) on the first image a is created as a synthesized image (step S65).

FIG. 6E is a diagram showing a display example of the synthesized image created at step S65. In the example shown in FIG. 6E, the second image in the order of reproduction shows the synthesized image a' created at step S65. Then, when the slide show reproduction is performed, for example, as shown in FIG. 6E, the slide show reproduction is performed repeatedly in the order of a→a'→b→c→d→a→a' . . . .

Figure 5:
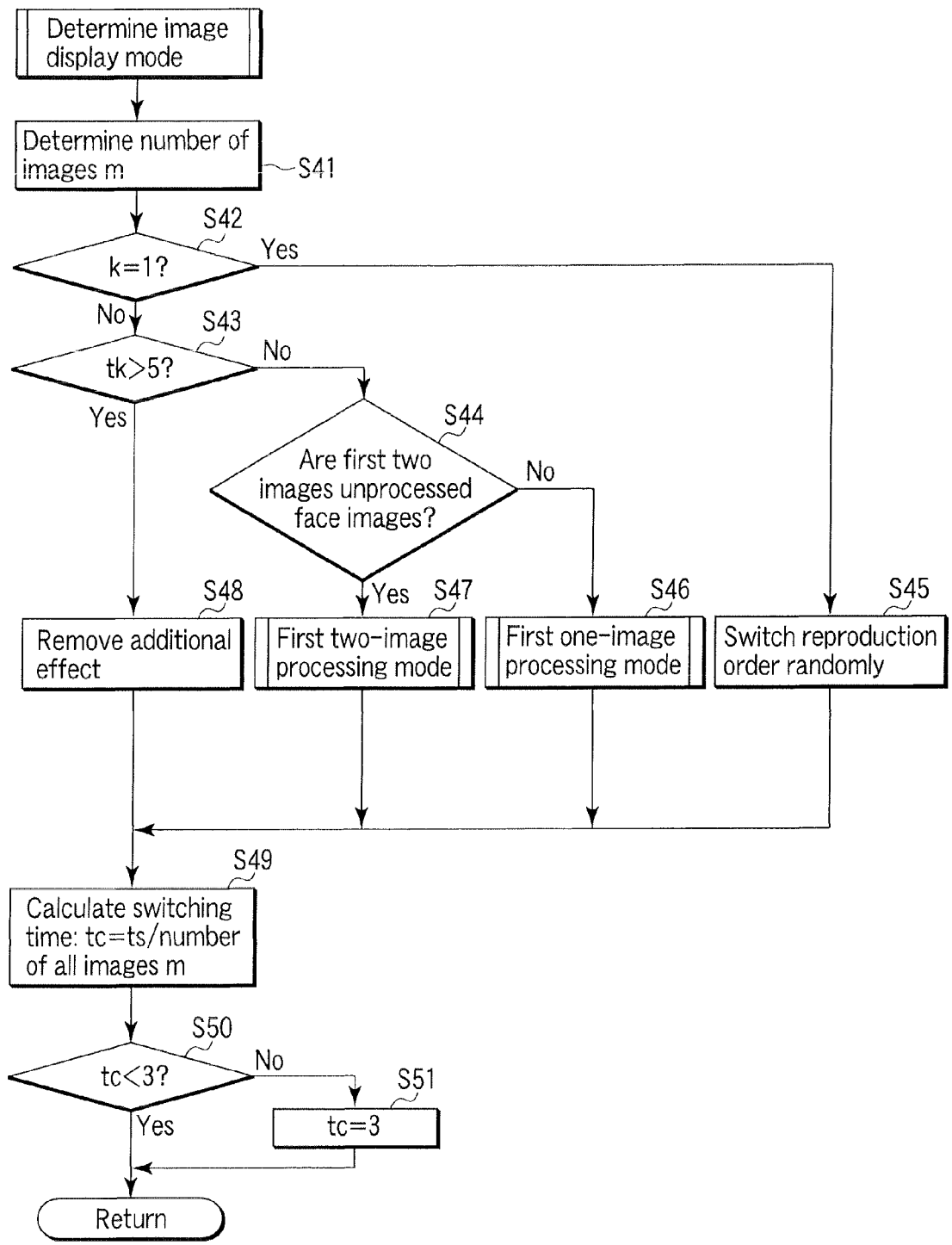
FIG. 5 is a diagram showing the flow chart of display mode determination processing.

When processing at step S62, step S64, or step S65 terminates, processing returns to the flow chart shown in FIG. 5.

If branched to YES at step S44 in the flow chart shown in FIG. 5, processing of "first two-image processing mode (mode in which synthesis processing is performed only on the first image and second image)" is performed (step S47).

Figure 8:
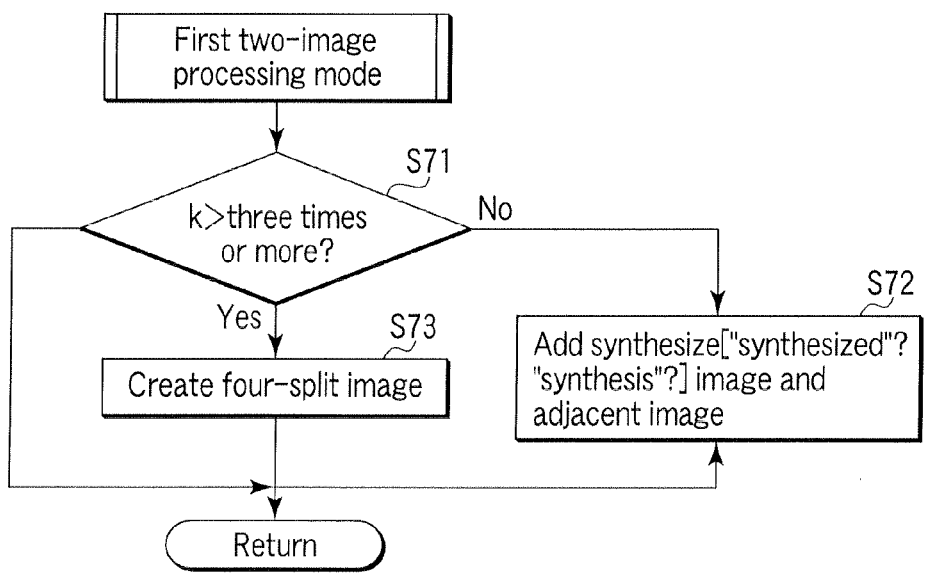
FIG. 8 is a diagram showing the flow chart of processing in first two-image processing mode.

A subroutine of the "first two-image processing mode" at step S47 will be described below with reference to the flow chart shown in FIG. 8. That is, if branched to YES at step S44, whether or not the number of times of vibration K>3 is determined (step S71). If branched to NO at step S71, a synthesized image (called (a×b)) in which the face part of the first image a and the face part of the second image b are synthesized is created (step S72). Then, when the slide show reproduction is performed, the slide show reproduction is performed repeatedly in the order of a→(a×b)→b→c→d→a . . . .

The synthesis processing at step S72 is performed by using morphing technology or the like after making the size of the face part substantially equal using, for example, a detection result of the face part. The morphing technology is a technology to exhibit a changeover from one image to another as if the change occurs quite naturally. The synthesis processing at step S72 can be said to be effective synthesis when, for example, the first two images are face images on which no synthesis processing has been performed.

On the other hand, if branched to YES at step S71, a synthesized four-split image in which two of the face parts of the first image a are arranged on the upper row, and two of the face parts of the second image b are arranged on the lower row (step S73). Then, the synthesized four-split image is made to be reproduced to display during slide show reproduction by inserting the image, for example, between a and b.

When processing at step S72 or step S73 terminates, processing returns to the flow chart shown in FIG. 5.

Incidentally, if branched to YES at step S43 in the flow chart shown in FIG. 5, that is, the vibration time tk continues for a fixed time or longer (here, 5 sec or longer), "additional effect removal processing" to remove all image processing performed at step S45 to step S47 is performed (step S48).

That is, at step S48, all synthesized images created based on the aforementioned vibration operation by the user and added to an original image row are removed from the original image row. All synthesized images created based on vibration operations of the digital camera by the user by that time and inserted into slide show reproduction are removed at step S48. This is effective processing when an image row that has become complicated should be removed or a new image row should be remade.

When processing any one of step S45 to step S48 is terminated, the camera control part 10 calculates an image switching time tc for slide show reproduction (step S49).

At step S49, the image display switching time tc is calculated from a "reproduction time of the selected piece of music" ts and the "number of reproduction candidate images" m so that all images in the relevant image row are reproduced just in a time of reproduction of one piece of music as $$tc=ts/m$$

Subsequently, whether or not tc is 3 (sec) or more is determined (step S50). If branched to NO at step S50, tc is uniformly reset to tc=3 (sec) (step S51).

The processing at step S51 is processing to make tc calculated at step S50 equal to or less than a predetermined value. The processing takes into consideration that if the reproduction time of one piece of image data is too long, the tempo of image switching becomes too slow as a slide show.

If branched to YES at step S50, or after processing at step S51 terminates, processing proceeds to step S24 in the flow chart shown in FIG. 4.

That is, the slide show control part 10b causes the tentative storage area for display 18a of the storage part 18 to tentatively store the synthesized image created by processing of the subroutine described with reference to FIG. 5 (step S24).

Then, the slide show control part 10b starts reproduction of image data and music data by controlling the music reproduction part 34 and the like in the above order of reproduction (step S25). Further, the slide show control part 10b determines whether or not the image display switching time tc has passed (step S26). If branched to YES at step S26, the image data to be reproduced is switched to the next image data (step S27).

If branched to NO at step S26, or after processing at step S27 terminates, the slide show control part 10b determines whether or not an operation to end the slide show reproduction is performed by the user (step S28). If branched to NO at step S28, processing returns to step S21. On the other hand, if branched to YES at step S28, the slide show reproduction is terminated.

Synthesis processing of images by vibration operations is not limited to one-time processing only and the above synthesis processing can be combined by providing vibration operations to the digital camera in a plurality of times. The number of images to be displayed can thereby be further increased.

An example of processing when a predetermined vibration operation is performed by a user and then another type of vibration operation is further performed will be described below with reference to FIG. 9A to FIG. 9C.
(When the number of times of vibration K=2→the number of times of vibration K=3)

Figure 9A:
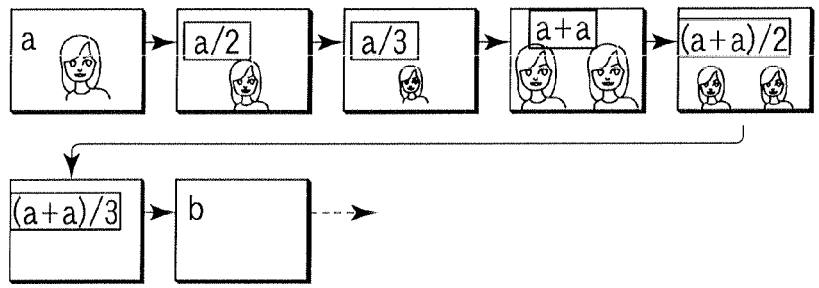
FIG. 9A is a diagram showing an example of the display of slide show reproduction.

FIG. 9A is a diagram showing a display example of slide show reproduction when a vibration operation of the number of times of vibration K=2 is performed and then a vibration operation of the number of times of vibration K=3 is further performed.

As shown in FIG. 9A, when the first vibration operation, that is, the vibration operation of the number of times of vibration K=2 is performed, the display is the same as the display example described with reference to FIG. 8 (2). Here, with the vibration operation of the number of times of vibration K=3 being further performed, as shown in FIG. 9A, three synthesized images ((a+a), (a+a)/2, and (a+a)/3) are added. (a+a)/2 is an image obtained by reducing (a+a) shown above by a factor of 2 and (a+a)/3 is an image obtained by reducing (a+a) by a factor of 3.

That is, when the slide show reproduction is performed, as shown in FIG. 9A, the slide show is performed repeatedly in the order of:
a→a/2→a/3→(a+a)→(a+a)/2→(a+a)/3→b→c→d→a→a/2 . . . .
(When the number of times of vibration K=2→the number of times of vibration K=3→the number of times of vibration K=4)

Figure 9B:
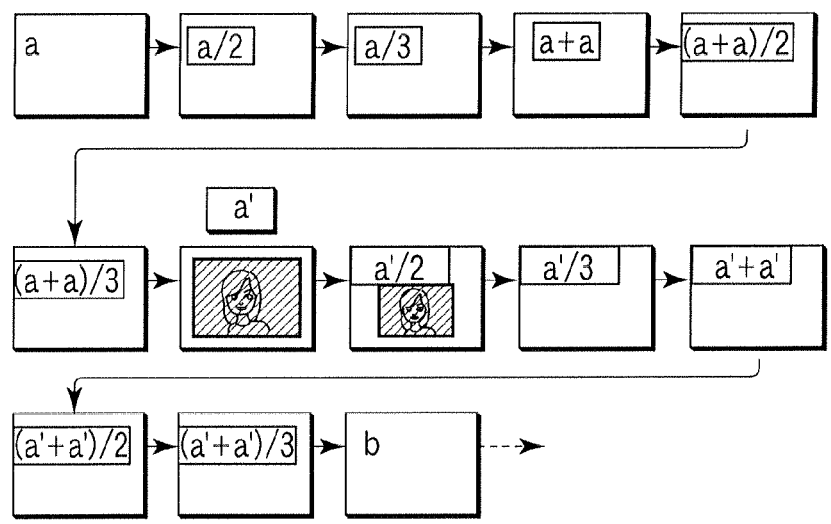
FIG. 9B is a diagram showing an example of the display of slide show reproduction.

FIG. 9B is a diagram showing a display example of slide show reproduction when a vibration operation of the number of times of vibration K=2 is performed, then a vibration operation of the number of times of vibration K=3 is performed and further, a vibration operation of the number of times of vibration K=4 is performed.

That is, by a series of these vibration operations, nine synthesized images ((a+a), (a+a)/2, (a+a)/3, a', a'/2, a'/3, a'+a', (a'+a')/2, (a'+a')/3) are further added to the display image when only the vibration operation of the number of times of vibration K=2 is performed.

That is, when the slide show reproduction is performed, as shown in FIG. 9B, the slide show is performed repeatedly in the order of:
a→a/2→a/3→a+a→(a+a)/2→(a+a)/3→a'→a'/2→a'/3→a'+a'→(a'+a')/2 . . . .
(When the number of times of vibration K=1→the number of times of vibration K=3)

Figure 9C:
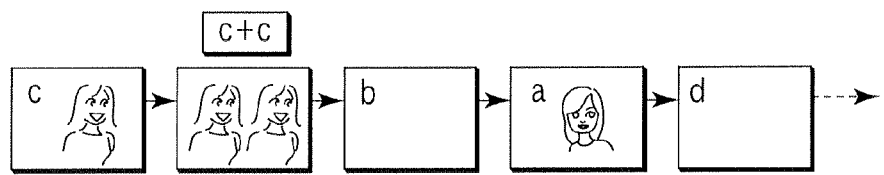
FIG. 9C is a diagram showing an example of the display of slide show reproduction.

FIG. 9C is a diagram showing a display example of slide show reproduction when a vibration operation of the number of times of vibration K=2 is performed and then a vibration operation of the number of times of vibration K=3 is further performed.

As shown in FIG. 9C, when the first vibration operation of the number of times of vibration K=1 is performed, the display is the same as the display example described with reference to FIG. 6B. Here, with the vibration operation of the number of times of vibration K=3 being further performed, as shown in FIG. 9C, a synthesized image (c+c) in which two of the face parts in c are arranged side by side is added. That is, when the slide show reproduction is performed, for example, as shown in FIG. 9C, the slide show reproduction is performed repeatedly in the order of c→(c+c)→b→a→d→c . . . .

Figure 10A:
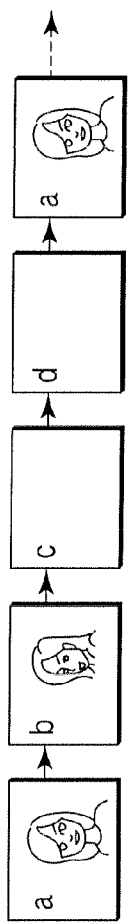
FIG. 10A is a diagram showing an example of the display of slide show reproduction.

Control by the camera control part 10 when more complex vibration operations are performed will be described with reference to FIG. 10A to FIG. 10D. It is assumed that the image row before the vibration operation is performed (number of times of vibration K=0) is, as shown in FIG. 10A, a→b→c→d . . . .

Figure 10B:
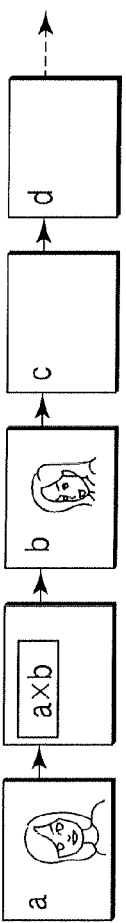
FIG. 10B is a diagram showing an example of the display of slide show reproduction.

If it is determined that the number of times of vibration K is not K>3 in the "first two-image processing mode" (if branched to NO at step S71), a synthesized image ((a×b)) in which the face part of the first image a and that of the second image b are synthesized is created (step S72). Then, when the slide show reproduction is performed, as shown in FIG. 10B, the slide show reproduction is performed repeatedly in the order of a→(a×b)→b→c→d→a . . . .

Then, when a predetermined vibration operation (here, a vibration operation of the number of times of vibration K=2) is performed again by the user, branching occurs at step S44 to NO because in the image row, while the first a is an image on which no image processing is performed, the second (a×b) is an image on which image processing is performed. That is, the "first one-image processing mode" will be applied.

In this case, enlarged/reduced images of the first image a are created after branching to YES at step S61 (step S62). Here, it is assumed that reduced images of a/2, (a×b)/2, and b/2 are created.

Figure 10C:
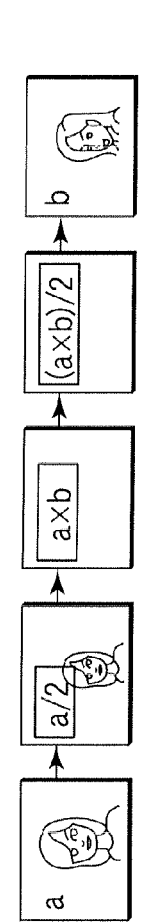
FIG. 10C is a diagram showing an example of the display of slide show reproduction.

With the processing described above, when the slide show reproduction is performed, as shown in FIG. 10C, the slide show reproduction is performed repeatedly in the order of a→a/2→(a×b)→(a×b)/2→b→b/2→c→d . . . .

Figure 10D:
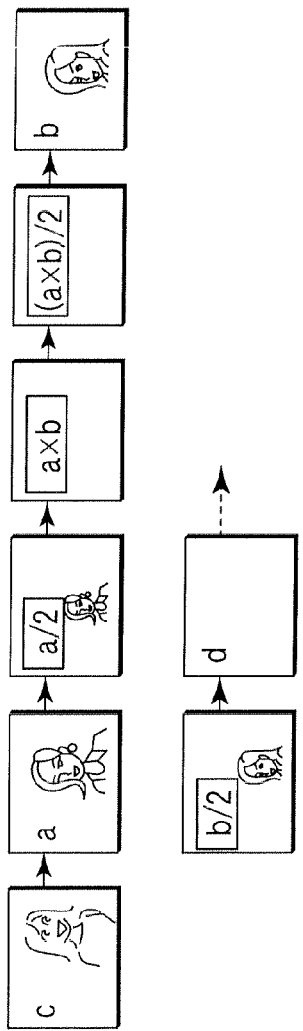
FIG. 10D is a diagram showing an example of the display of slide show reproduction.

If, for example, vibration operations of the number of times of vibration K=3, the number of times of vibration K=2, and the number of times of vibration K=1 are performed in this order, the reproduction order of slide show reproduction described with reference to FIG. 10C is randomly changed (See FIG. 10D). Then, in this reproduction order, the first two images (c and a) are face images on which no image processing is performed. Therefore, when the next vibration operation is performed, branching occurs to YES at step S44 to enter the processing of "first two-image processing mode" described above.

According to the first embodiment, as described above, even if the number of images for slide show reproduction is small, a reproducer capable of performing slide show reproduction full of variety by simple operations of a digital camera, a slide show reproduction method, a program, an image display apparatus, an image display method, and an image display program can be provided.

More concretely, when a user operates a digital camera according to the first embodiment through vibration, images obtained by performing various kinds of image processing such as enlargement processing, reduction processing, division processing, and color processing on images concerning the slide show reproduction are automatically created.

Therefore, even if there are only a small number of pieces of image data on a theme concerning the slide show reproduction to perform the slide show reproduction, according to a digital camera in the first embodiment, the display of a rich variety of images is enjoyed, for example, by variations being created from one theme song.

More specifically, in a digital camera according to the first embodiment, the number of pieces of image data is increased by performing various kinds of image operation on images concerning the slide show reproduction based on vibration operations (the number of times of vibration K and the vibration time tk) by a user. The number of images to be displayed within the reproduction time tm of music data is thereby increased and therefore, the more the digital camera is swung, the faster images in the slide show reproduction are switched.

According to conventional technology, when the number of pieces of image data concerning the slide show reproduction is small, and when image data is reproduced and displayed to coincide with the reproduction of music data, reproduction of the same image data is repeatedly displayed at regular intervals. That is, the slide show reproduction is very monotonous and boring for viewers.

However, according to a digital camera in the first embodiment, even if the number of pieces of image data concerning the slide show reproduction is small, images (slide show secondary images) on which various kinds of image processing are performed are added when necessary based on vibration operations of the digital camera by the user, and thus slide show reproduction of elaborate content can be created. Therefore, when the slide show reproduction is performed, such processing as to unreasonably include images that are only loosely related to the theme of images concerning the slide show reproduction in reproduction candidate to increase the number of pieces of image data for reproduction becomes unnecessary.

Further, when a digital camera according to the first embodiment is used, the user can switch various reproduced images described above by a simple operation of only swinging the digital camera. The vibration operation is an intuitive operation somewhat in common with an operation such as stirring ingredients in a vessel or destroying an object by applying an impact to it, and is a very easy and natural operation for the user.

Thus, according to a digital camera in the first embodiment, slide show reproduction in which images rich in variety are switched in quick tempo one after another to show interesting images can be performed, regardless the number of images concerning the slide show reproduction.

In the foregoing, an embodiment of the present invention has been described, but the present invention is not limited to the embodiment and various alterations and modifications can naturally be made without deviating from the scope thereof.

For example, the vibration detection part 33 in the first embodiment is simply a member to determine a vibration operation applied to the digital camera, but in addition, a hexaxial sensor or the like may be used as the vibration detection part 33 so that more complex operations than a vibration operation such as a stirring operation or a throwing operation can be determined. When such a constitution is adopted, the number of types of image synthesis processing can be increased.

Regarding each piece of processing carried out by the camera control part 10 described above, a portion or all of the processing may be constituted by hardware. Processing by the face detection part 22 or the like may be constituted by software. Naturally, a concrete constitution is a matter of design.

Incidentally, various kinds of control processing by the camera control part 10 are realized as described below. Namely, a software program stored in the ROM 13 is supplied to the camera control part 10 and the camera control part 10 causes each part to perform the above operations according to the supplied program to realize various kinds of control processing.

That is, the software program itself realizes functions of the camera control part 10. Therefore, the program itself is an embodiment of the present invention. Naturally, a recording medium storing the program is also an embodiment of the present invention. The recording medium that can be used includes an optical recording medium such as a flash memory, CD-ROM, and DVD-ROM, a magnetic recording medium such as an MD, a tape recording medium, and a semiconductor memory such as an IC card.

The first embodiment is described by taking a digital camera as an example, but the first embodiment is not limited to the digital camera and may be applied, for example, to a camera part provided with a mobile phone.

Second Embodiment

A camera according to the second embodiment of the present invention will be described below. FIG. 11 is a block diagram showing the configuration of a camera 10 according to the second embodiment of the present invention. The camera 10 is a digital camera and has a control part 1, an imaging part 2, an optical system control part 3, a recording part 4, a face detection part 5, a cutout part 6, a synthesis processing part 7, a display part 8, a display control part 8a, a clock part 9, an operation determination part 11, a position information part 12, and a communication part 14. The camera 10 can also be connected to a database 20 with a search function in an external server via an Internet network 15.

The control part 1 is connected to each part of the camera 10 and centrally controls the whole camera 10 in accordance with an operation of an operation member or the like determined by the operation determination part 11 following timing control by a timing control part 1b. One of the main features of a camera according to the second embodiment is the display of reproduction and timing of switching the display provided by the timing control part 1b.

The control part 1 includes an image processing part 1a, a classification part 1c, and a display face size determination part 1d. The image processing part 1a performs various types of image processing such as compression processing of images. The classification part 1c determines and classifies scenes of image shots based on the shooting date/time and shooting position information described later. The display face size determination part 1d determines the size of faces in an image shot based on detection by the face detection part 5 or the like.

The imaging part 2 includes an optical system to form an object image and an image sensor for performing photoelectric conversion of an object image and outputs image data. The optical system control part 3 exercises control of focusing of the optical system in the imaging part 2 and the like.

The recording part 4 records image data on which compression processing and the like is performed by the image processing part 1a in the control part 1 as image shots. When image shots are recorded, the position and size of the face of an object person are detected by the face detection part 5, which will be described in detail later, and the information is recorded as a file by association with image data acquired by shooting. The recording part 4 includes a tentative storage part for display 4a and a supplementary information storage part 4b.

The tentative storage part for display 4a tentatively stores images on which image processing has been performed so that many images can be made to display when image shots are appreciated. The supplementary information storage part 4b stores, in addition to image data acquired by shooting, supplementary information such as related information and related images used for reproducing and displaying images.

In the second embodiment, for example, when an image shot in which an object person shows a smiling face is displayed, an image showing a reason why the object person shows a smiling face is successively displayed as a supplementary image subsequent to the image shot in which the object person shows a smiling face. The image displayed at this point is stored in the tentative storage part for display 4a. In addition to images shot by a photographer of the camera 10, related images may be downloaded from the database 20 with a search function and used.

When any person image is included as an object in an image shot, the face detection part 5 detects a face portion by determining a face pattern of the object person. Based on a result of the detection, the optical system control part 3 exercises exposure control, automatic focusing (AF) and the like. The face detection part 5 also has a position detection part 5a and a size determination part 5b. The position detection part 5a detects the position in the screen of a face portion of an object person detected by the face detection part 5. The size determination part 5b determines the size of a face portion of a detected object person.

The cutout part 6 cuts out image data corresponding to a face portion of an object person detected by the face detection part 5. In addition to being subjected to determination processing by the display face size determination part 1d in the control part 1, image data of a face portion cut out here is used for synthesis processing of images by the synthesis processing part 7.

The synthesis processing part 7 performs synthesis processing of an image shot and a supplementary image and an image obtained by the synthesis processing is displayed when a supplementary image is displayed subsequent to the reproduction and display of the image shot. For example, when an image shot in which an object person shows a smiling face is reproduced and displayed, enlargement processing to gradually enlarge a face portion in the image in which the object person shows a smiling face is performed centering on the face portion detected by the face detection part 5 and cut out by the cutout part 6 and a transitional image concerning the enlargement processing and a supplementary image are synthesized and displayed.

The display part 8 is constituted by a display device such as a liquid crystal monitor, arranged on the rear side of the camera 10, reproduces and displays image data recorded in the storage part 4 and also makes a live view display for observation of an object image in place of an optical finder. The display part 8 reproduces and displays image shots recorded in the storage part 4 and also reproduces and displays synthesized images obtained by synthesizing an image shot and a supplementary image. In the reproduction and display, which will be described in detail later, in the case of an image in which an object person shows a smiling face, an image shot of a smiling face is first reproduced and displayed (image A in FIG. 11) and while enlarging a face portion (image B in FIG. 11), a supplementary image showing a reason for a smiling face is displayed (image C in FIG. 11). The display of the display part 8 is controlled by the display control part 8a.

The clock part 9 has a clock function and a calendar function and is used for acquisition of date/time information when shooting and the like. The date/time information is recorded as a file together with image shots when image shots are recorded in the recording part 4.

The operation determination part 11 determines the operating state of an operation member or the like of the camera 10 by a user. The control part 1 controls the camera 10 in accordance with the operating state.

The position information part 12 acquires information about the position of the camera 10 by receiving radio wave information by mobile phones or that by GPS. The information acquired here is recorded as a file together with image shots in the storage part 4.

The communication part 14 transmits and receives information to/from equipment such as the database 20 with a search function in a server via the Internet network 15 and the like. Image shots can be transmitted to the outside and images and the like can be received from outside via the communication part 14.

An image display method of the camera 10 according to the second embodiment will be described below.

Generally, when image shots are sequentially reproduced and displayed in slide show reproduction, for example, when an image in which an object person shows a smiling face is reproduced and displayed, viewers cannot understand the reason why the object person shows a smiling face even if an image shot in which the object person shows a smiling face is first displayed.

Thus, in the second embodiment, for example, an image is reproduced and displayed in the following manner. First, an image shot is reproduced and displayed (FIG. 12A, t1) and the object person is displayed while being enlarged centering on an eye portion of the object person and with the contrast being lowered (FIG. 12A, t2, t3). Then, the screen is switched with an effect that another image (supplementary image) emerges from the pupil to enable viewers to guess at the reason for the smiling face, creating an illusion that what is mirrored in the eye will be reproduced. That is, while a supplementary image is being enlarged, a synthesized image in which the supplementary image is superimposed on an image shot is displayed (FIG. 12A, t4, t5) and finally, only the supplementary image is displayed (FIG. 12A, t6).

In the display example shown in FIG. 12A, the supplementary image shows a health resort from a long time ago. Viewers can intuitively understand that the object person in the image shot reproduced and displayed at t1 shows a smiling face because the object person visited the health resort a long time ago, thus can obtain enjoyment through appreciation of the supplementary image.

Figure 12B:
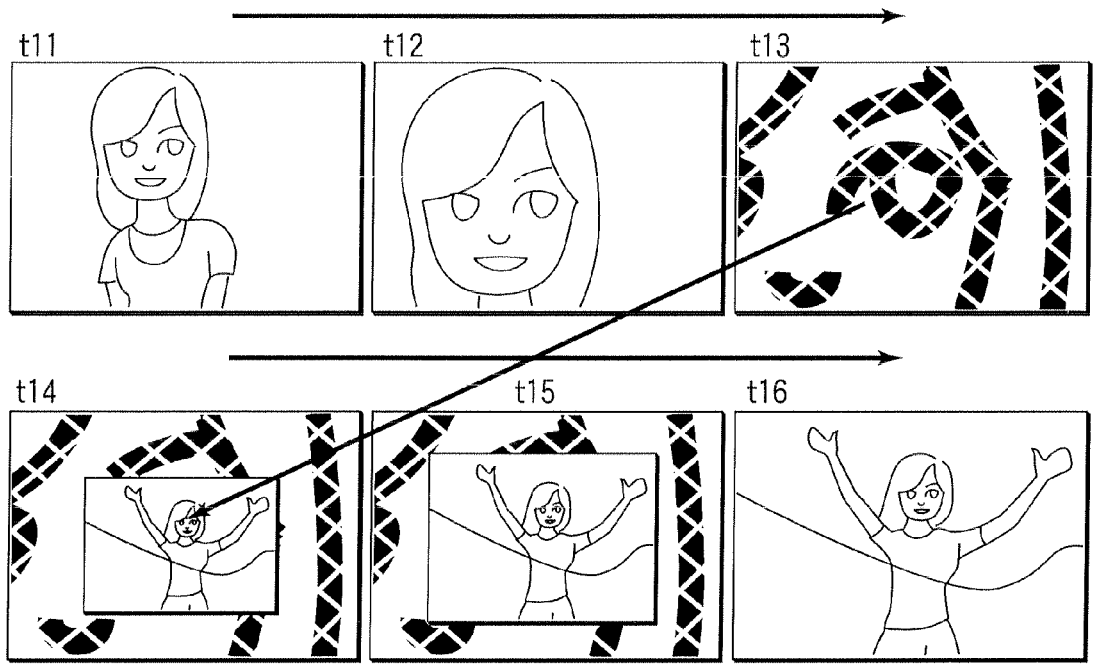
FIG. 12B is a diagram showing the basic method of reproducing camera images in the second embodiment of the present invention and a diagram showing the basic method of reproducing image shots during an athletic meet.

The example shown in FIG. 12B is an image of an object person showing a smiling face in an athletic meet. In an athletic meet, parents often repeatedly shoot their children, and in this case a conspicuous scene of the same person or the like is adopted as a supplementary image. As shown at timing t11 to t13 in FIG. 12B, the object person with a smiling face is displayed while being gradually enlarged and contrast being lowered and from timing t4 to t5, a goal scene of a running race is superimposed on a pupil portion of the object person displayed by being enlarged and displayed as a supplementary image.

In the example in FIG. 12B, why the object person shows a smiling face is supplementary explained by displaying a goal scene of a running race of the object as a supplementary image. By displaying a supplementary image in this manner, viewers who were not at the shooting site can also understand easily why the object person has a smiling face so that appreciation becomes more amusing.

Scenes of supplementary images are images that can persist in one's mind, though it is not scenes directly viewed. Here, the reproduction and display is made such that a pupil portion of an object person of an image shot is caused to display by enlarging the pupil portion to evoke an image thereof. In addition to enlargement of a pupil portion shown above, a forehead or a chest may also be enlarged to produce an effect to evoke an image therefrom. While in the description of the second embodiment an object person is displayed by enlarging an image shot and also lowering contrast of the object, only one of the image effects may be adopted. That is, an image effect to suggest screen switching is enough.

If, when an image shot is enlarged, a flaw of skin of an object person such as wrinkles or blotches of the object person is enlarged, interest may be dampened. Thus, if a predetermined enlargement ratio is reached when an image shot is enlarged, the image shot may be blurred to make a flaw of skin of the object person inconspicuous. In such a case, a difference of light and darkness in the image shot is made smaller and contrast is lowered by making corrections in the light direction.

Figure 13:
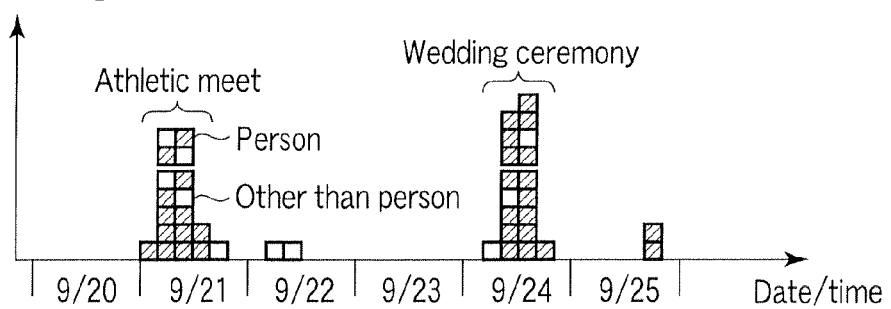
FIG. 13 is a diagram illustrating the classification of image shots in the second embodiment of the present invention.

In the second embodiment, as described above, a supplementary image suitable as an image shot is selected. For the selection of a supplementary image, it is necessary to determine a shooting scene concerning the image shot. The classification part 1c in the control part 1 determines the shooting scene. FIG. 13 is a graph exemplifying how image shots are classified by time information. Image shots in which a face is detected by the face detection part 5 are displayed by being shaded.

As shown in FIG. 13, when there are a large number of images, it is assumed that some event took place on that date/time. For example, many photos were taken from the forenoon to the afternoon on September 21 and the number of photos with persons as objects is smaller than that on September 24. On September 24, photos were taken mainly from the afternoon to the evening and the ratio of photos with persons as objects is high. From the above information, shooting on September 21 is estimated to be in an athletic meet and that in September 24 to be in a wedding ceremony. If the event that took place on September 24 is a wedding ceremony, when shot images are reproduced on September 25, the images are classified as images of the previous day. If images shot on September 24 and those shot on September 25 are mixed, the problem such as private images mixed up with images of work during reproduction may arise. Therefore, events concerning image shots need to be classified in advance.

In the second embodiment, as described above, events concerning shooting are analyzed using date/time information and the shooting position are recorded together with image shots and person presence/absence information about, for example, whether or not a face is present obtained by analyzing image shots. Based on the information and analysis results, supplementary images are selected and images are reproduced and displayed.

Detailed operations of the camera 10 according to the second embodiment using the technique described above will be described with reference to the flow charts shown FIG. 14 to FIG. 17. FIG. 14 is a diagram showing the flow chart showing an operation of camera control of the camera 10. First, whether or not the shooting mode is set is determined (step S1). If it is determined that the shooting mode is set, whether or not an operation to fully press a release button is performed is determined (step S2).

If it is determined at step S2 that no operation to fully press a release button is performed, processing returns to step S1. On the other hand, if it is determined that an operation to fully press a release button is performed, shooting is done by the imaging part 2 to acquire image data of still images and the image data (image shots) is recorded in the recording part 4 (step S3).

Date/time information is acquired from the clock part 9 and is recorded as a file together with image data (step S4). Subsequently, face position information is acquired from the position detection part 5a of the face detection part 5 and size information is acquired from the size determination part 5b to record the information as a file together with image data (step S5). Image data, date/time information, face position information, and size information may be recorded in the recording part 4 as a file.

Next, whether or not any image shot immediately before the shooting this time is present is determined (step S6). Whether or not any image was shot immediately before is determined using date/time information recorded together with image data and if the date/time of both shootings is separated by a predetermined time or less, shooting is determined to be "immediately before". An appropriate value of a threshold to be used for determining whether or not immediately before is decided in advance as a design value. If, as a result of determination at step S6, no shooting was done immediately before, processing returns to step S1.

On the other hand, if there is an image shot immediately before, the event is determined using images of immediately before and this time (step S7). Images shot immediately before are classified into an image group consisting of images acquired in the same event. By performing processing to classify images into the same image group, it becomes possible to prevent images of inappropriate opportunities from mistakenly being selected as supplementary images and to appreciate them together with supplementary images also when third parties are viewing the images so that on what occasion photos were taken can be known. That is, a camera can be used as a communication tool by a simple operation. In addition to images shot by the camera 10, supplementary images can be acquired from outside via the communication part 14.

In the event determination, as described with reference to FIG. 13, date/time information and the shooting position recorded together with image data and person presence/absence information about, for example, whether or not a face is present obtained by analyzing image data are used to perform event analysis concerning shooting. A routine for the event determination will be described later using FIG. 15.

If it is determined at step S1 that a shooting mode is not set, next, whether or not the communication mode for performing communication is set is determined (step S11). That is, whether or not the camera 10 is set to the communication mode is determined by the operation determination part 11. The communication is communication of the communication part 14 with an outside server such as the database 20 with a search function via the Internet network 15 and information such as supplementary images is acquired through the communication. If, as a result of determination at step S11, communication should be performed, whether or not any image of trip is present is determined (step S12).

Incidentally, if image shots are recorded at step S3, subsequently at step S7, image shots are classified by performing an event determination. If an event determination determines that, for example, an image shot concerning the event determination is an image acquired from a trip, information showing a result of the determination is also recorded. Then, at step S12, whether or not the image is an image acquired in a trip is determined with reference to the event determination result.

If it is determined at step S12 that there is no trip image, processing returns to step S1. On the other hand, if it is determined at step S12 that there is a trip image, date/time information when the trip image was acquired and position information where the trip image was shot are transmitted (step S13). That is, the database 20 with a search function is accessed via the Internet network 15 to search whether or not information having the same position information as the trip image is present (step S14).

If, as a result of determination at step S14, no information having the same position information as the trip image is present, processing returns to step S1. On the other hand, if information having the same position information as the trip image is present, the information is acquired (step S15) and the information is made into a supplementary image to store the supplementary image in the supplementary information storage part 4b (step S16).

That is, if an image shot is classified into a trip image, images shown below can be used as a supplementary image. Namely, an image that can be used as a supplementary image may be selected from among image shots, or the fact that various images are accumulated on a server accessible through the Internet network 15 may be utilized to use an accumulated image as a supplementary image.

If it is determined at step S11 that the communication mode is not set, whether or not the smiling face reproduction mode is set is determined (step S21). That is, at step S21, whether or not the smiling face reproduction mode is set is determined by the operation determination part 11. If it is determined at step S21 that the smiling face reproduction mode is set, as described with reference to FIG. 12A and FIG. 12B, image shots and supplementary images are combined for reproduction and display.

That is, first an image in which an object person having a smiling face is present in the field center is displayed (step S22). For example, like at timing t1 shown in FIG. 12A or at timing t11 shown in FIG. 12B, an image in which an object person having a smiling face is shot is displayed in the display part 8. Subsequently, a supplementary image is read (step S23). In the subroutine of event determination at step S7 (or at step S16 for a trip image), a supplementary image corresponding to each image shot is selected for each image shot and associated (paired). At step S23, the supplementary image associated (paired) with the image shot displayed at step S22 is read from the supplementary information storage part 4b.

Subsequently, the face part of the object person is displayed transitionally using the read supplementary image (step S24). That is, like t2 to t6 in FIG. 12A or t12 to t16 in FIG. 12B, the image shot is displayed while being enlarged centering around a pupil portion of the object person and then, the supplementary image is displayed while being gradually enlarged. Simultaneously with the transitional display, the speed of enlargement and blurring processing are controlled in accordance with the size of the face part. In the smiling face reproduction, as described above, a supplementary image showing why an object person makes a smiling face is displayed, and thus viewers can know the reason for a smiling face. An operation of the subroutine will be described later using FIG. 17.

When the subroutine of displaying the face part transitionally at step S24 ends, processing returns to step S21, and if the smiling face reproduction mode is still set, processing from step S22 to step S24 is performed for the next image shot.

If it is determined at step S21 that the smiling face reproduction mode is not set, the normal image reproduction mode is set (step S31) and whether or not to perform reproduction in the thumbnail display method is determined (step S32). That is, the normal image reproduction mode has two methods; a thumbnail display method and a reproduction and display method in which images are sequentially displayed in the order of shooting, and thus which method is set is determined at step S31.

If it is determined at step S32 that the thumbnail display method is set, the thumbnail display and an enlarged display of the selected image shot are made (step S33). On the other hand, if the thumbnail display method is not set, image shots are sequentially enlarged for display in the order of shooting (step S34). When the reproduction and display at step S33 or step S34 ends, processing returns to step S1.

Figure 15:
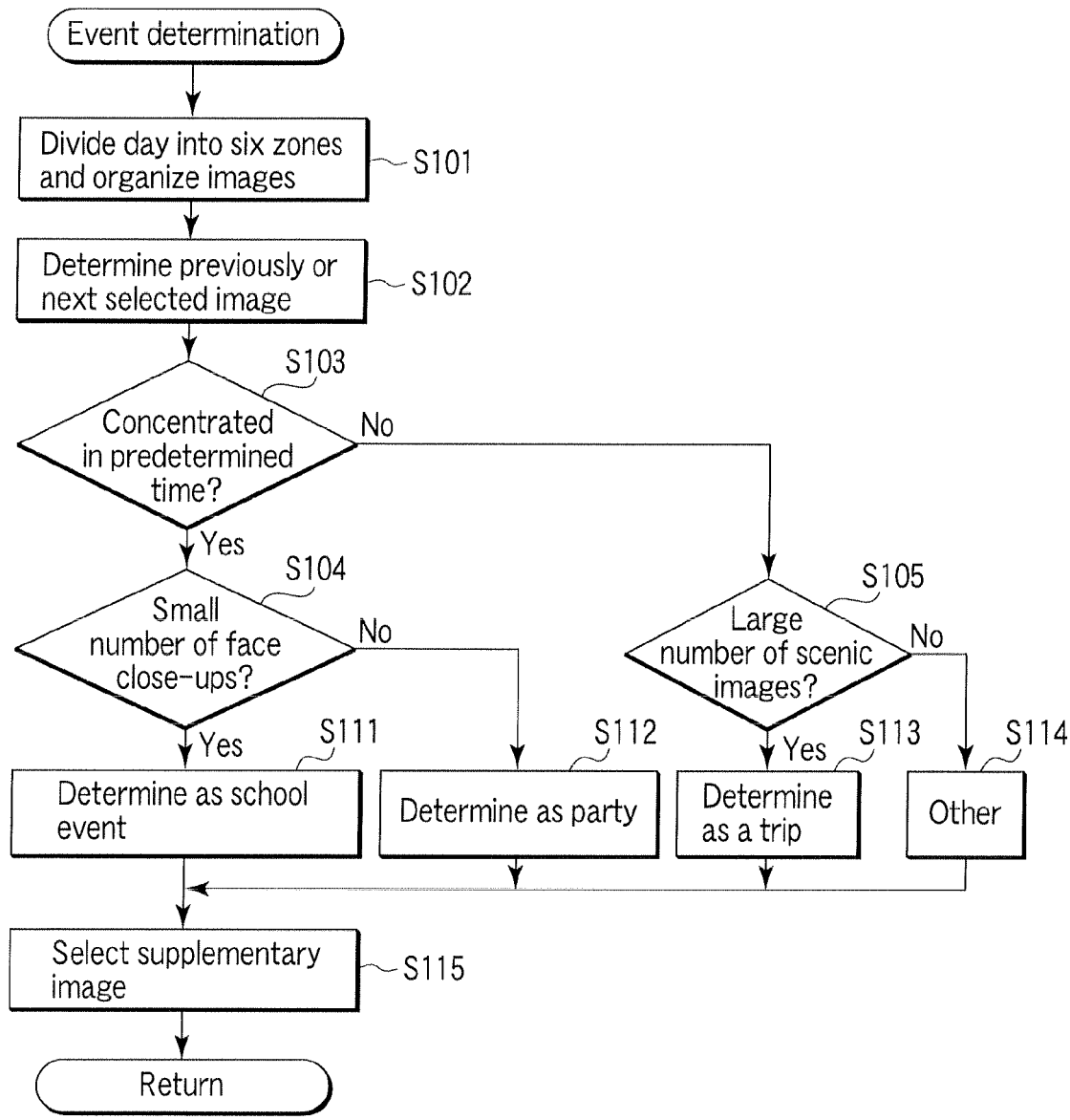
FIG. 15 is a diagram showing the flow chart showing the operation of event determination in the camera according to the second embodiment of the present invention.

The subroutine of event determination at step S7 will be described below with reference to the flow chart shown in FIG. 15. When processing of the flow chart is started, first a day (24 hours) is divided into six time zones and image shots are classified into each time zone based on the shooting time (step S101). The image organization is performed by the shooting time zone using the date/time information recorded together with the image shot. While 24 hours are divided into six time zones for classification in the present embodiment, the present invention is not limited to this and the division number may suitably be changed, such as four division and eight division. Subsequently, images previously or next selected image are determined (step S102). That is, only the latest images are selected and determined here to be separate event from a group of images of the previous day.

Next, the event of image shots is determined from step S103 to step S105. First, whether or not image shots are concentrated in a predetermined shooting time zone is determined (step S103). That is, at step S103, a determination as to whether or not shooting is concentrated in any of the six-divided time zones is made. If it is determined at step S103 that image shots are concentrated in a predetermined shooting time zone, whether or not the number of images in which a close-up of the face part of an object person is shot is smaller than a predetermined number is determined based on a detection result by the face detection part 5 (step S104).

If it is determined at step S104 that the number of images in which a close-up of the face part of an object person is shot is smaller than the predetermined number, the image shots are determined to be images acquired by shooting in a school event such as an athletic meet (step S11).

On the other hand, if it is determined at step S104 that the number of images in which a close-up of the face part of an object person is shot is larger than the predetermined number, the image shots are determined to be images acquired by shooting in a party (step S112).

School events such as an athletic meet are often held over a short period of time, and parents photograph their children from a distance and thus, the number of images in which close-ups of the face part of object persons are shot tends to be small. On the other hand, while parties are similar to school events in that they do not take up much time, the number of images showing close-ups of the face part is larger. On the basis of this fact, images acquired by shooting in a school event and those acquired by shooting in a party can be distinguished.

If it is determined at step S103 that image shots are not concentrated in a predetermined shooting time zone, whether or not the number of scenic images is larger than a predetermined number is determined (step S105). If it is determined at step S105 that the number of scenic images is larger than the predetermined number, the images are determined to be images acquired by shooting in a trip (step S113).

On the other hand, if it is determined at step S105 that the number of scenic images is not larger than the predetermined number, the images are determined to be "other images" (step S114).

Because shooting is generally distributed in each time zone and rarely concentrated in a short time in a trip and the ratio of scenic images increases, a determination is made as described above. If the ratio of scenic images is small, the event concerning shooting is neither a trip nor a school event nor a party, and thus a determination of "other images" is made. Information indicating the event determined from step S111 to step S114 is recorded together with image shots as shooting information.

When the determination of events described above is completed, supplementary images are selected in accordance with each event (step S115). In the subroutine of supplementary image selection, a supplementary image suitable for the determined event is each selected from among image shots recorded in the camera 10 or images acquired from the outside database 20 with a search function. When the subroutine of supplementary image selection is completed, processing returns to the original flow chart.

Selection processing of a supplementary image at step S115 will be described below using the flow chart in FIG. 16. First, whether or not the event concerning an image shot is a school event is determined (step S121). If it is determined at step S121 that the event concerning the image shot is a school event, an image that includes the same object person in the same scene and has a high contrast value is searched for and selected (step S131). In the present example, as shown in FIG. 12B, an image of a scene including the same person in the same school event is selected. When the selection is made, processing returns to the original flow chart.

If it is determined at step S121 that the event concerning the image shot is not a school event, whether or not the event concerning the image shot is a party is determined (step S122). If it is determined at step S122 that the event concerning the image shot is a party, an image in which many people are photographed in the same scene is selected (step S132). At a wedding reception, for example, in addition to photos of individuals, many participants are often photographed together and such an image is selected. By selecting an image in which many people are photographed as a supplementary image, the atmosphere of the party can be conveyed by the supplementary image. When the selection is made, processing returns to the original flow chart.

If it is determined at step S122 that the event concerning the image shot is not a party, whether or not the event concerning the image shot is a trip is determined (step S123). If it is determined at step S123 that the event concerning the image shot is a trip, a scenic image of the same scene or corresponding information is selected (step S133). In this case, a scenic image shot in the same area as a shooting area of an image shot in which an object person makes a smiling face or an image based on information acquired at step S13 to step S16 is selected as a supplementary image. By using such a supplementary image, viewers can recognize not only a simple smiling face, but also the background thereof. When the selection is made, processing returns to the original flow chart. According to the second embodiment, as described above, when appreciating an image in which an object person shows a smiling face, viewers can know in which circumstances the object person makes a smiling face.

If it is determined at step S123 that the event concerning the image shot is not a trip, classification processing of the event concerning the image shot cannot be performed and in that case, an image whose shooting time is close to that of the image shot is selected (step S134). Incidentally, an image in which a different person from a person shot in the image shot may be selected as a supplementary image to explain the circumstances from a different viewpoint. When the selection processing described above is completed, processing returns to the original flow chart.

Figure 17:
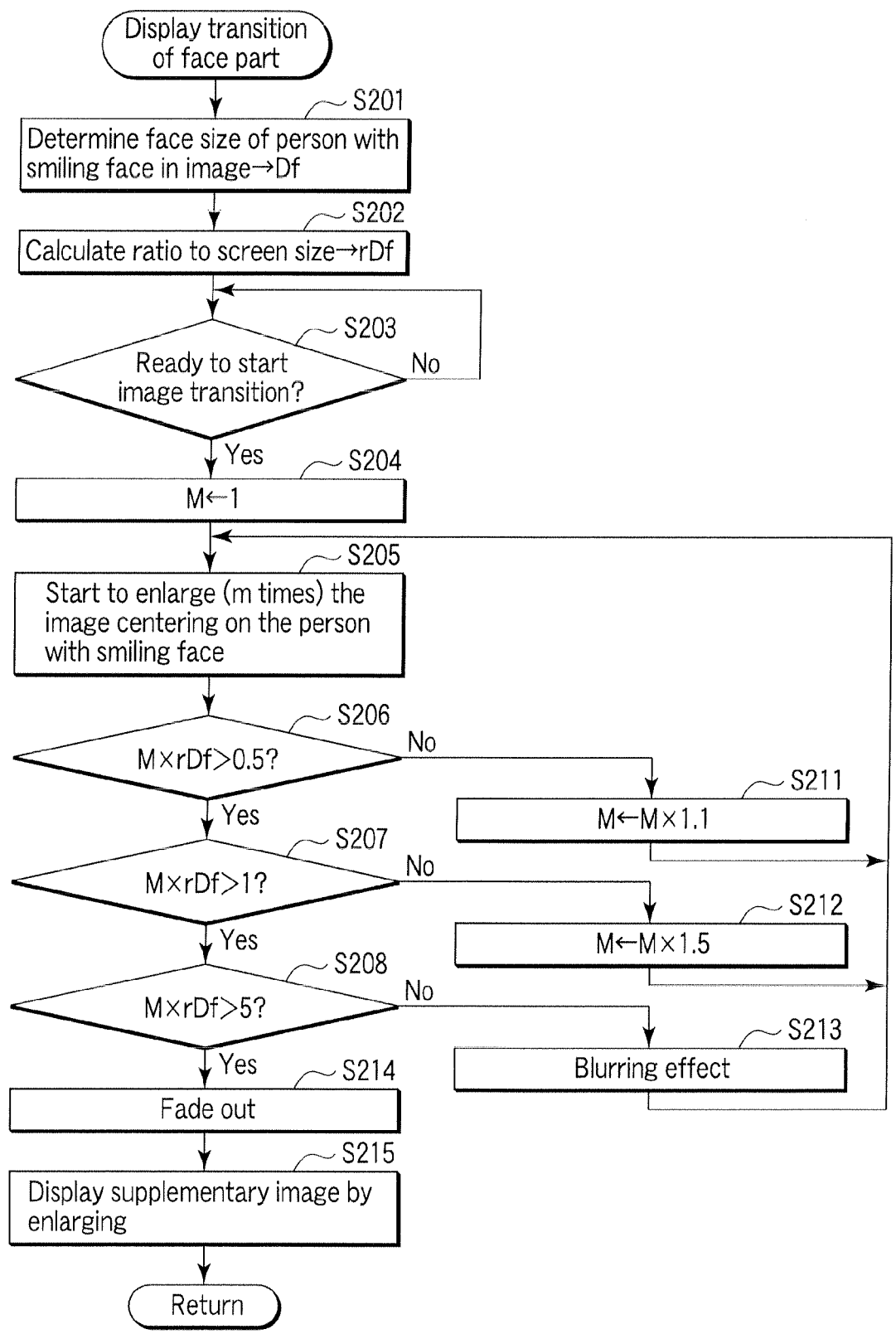
FIG. 17 is a diagram showing the flow chart showing the operation of display transition of a face in the camera according to the second embodiment of the present invention.

Processing of the subroutine of displaying a face part transitionally at step S24 will be described below with reference to the flow chart shown in FIG. 17. As described with reference to FIG. 12A and FIG. 12B, the subroutine makes a display of switching from an image shot to a supplementary image. That is, the size of the face part of a person with a smiling face in the screen is determined by the display face size determination part 1d and the size thereof is set as Df (step S201). Df is set, for example, by how many pixels of pixels constituting the display screen the size of the face part corresponds to. If there are many faces in the image shot, a face part close to the center or a larger face part is preferentially measured and set.

Subsequently, a ratio r of the face part to the size of the display screen is calculated and set as rDf (step S202). Since the size of the display screen is constant, the ratio r can be calculated using Df set at step S201. If the number of pixels is used to set Df at step S201, the ratio of the number of pixels representing the size of the face part to that constituting the display screen is calculated.

Next, whether or not transition of the display image can be started is determined (step S203). More concretely, at step S203, the size of the face part is determined and whether or not reproduction of a supplementary image is ready is determined. If branched to NO at step S203, readiness of transition of the display image is awaited. If branched to YES at step S203, 1 is set as the initial value of an enlargement ratio M of an image (step S204) and the display is started by enlarging the image centering around the object person with a smiling face (step S205). Since the enlargement ratio M when the display is started is set as M=1 at step S204, the display starts with an actual size.

When enlargement of the image is started, whether or not the value of (M×rDf), which is a value obtained by multiplying the ratio rDf of the size of the display screen by the enlargement ratio, is larger than 0.5 (whether the size of the face part of the enlarged object person is larger than half the size of the display screen) is determined (step S206). If it is determined at step S206 that the value of (M×rDf) is not larger than 0.5 (the size of the face part of the enlarged object person is not larger than half the size of the display screen), the enlargement ratio M is set to 1.1 before returning to step S205.

If it is determined at step S206 that the value of (M×rDf) is larger than 0.5 (the size of the face part of the enlarged object person is larger than half the size of the display screen), whether or not the value of M×rDf is larger than 1 (the size of the face part of the enlarged object person is larger than the size of the display screen) is determined (step S207). If it is determined at step S207 that the value of M×rDf is not larger than 1 (the size of the face part of the enlarged object person is not larger than the size of the display screen), the enlargement ratio M is set to 1.5 before returning to step S205. If the enlargement ratio M is set to 1.5, the enlargement speed of an image becomes faster compared with when the enlargement ratio M is 1.1.

If it is determined at step S207 that the value of M×rDf is larger than 1 (the size of the face part of the enlarged object person is larger than the size of the display screen), whether or not the value of M×rDf is larger than 5 (the size of the face part of the enlarged object person is larger than five times the size of the display screen) is determined (step S208). If it is determined at step S208 that the value of M×rDf is not larger than 5 (the size of the face part of the enlarged object person is not larger than five times the size of the display screen), image processing to add a blurring effect to an image is performed. That is, at step S205, enlargement processing of the image is performed by retaining the enlargement ratio M=1.5 while blurring the image.

If it is determined at step S208 that M×rDf is larger than 5 (the size of the face part of the enlarged object person is larger than five times the size of the display screen), reproduction and display of the image shot is faded out (step S214). That is, reproduction and display of the image shot is caused to gradually disappear. With the disappearance thereof, the supplementary image read at step S23 is enlarged (step S215). As shown at timing t4 to timing t6 shown in FIG. 12A or at timing t14 to timing t16 shown in FIG. 12B, this is done by displaying the image shot while superimposing the supplementary image on the image shot and performing enlargement processing of the supplementary image. Image synthesis processing at this point is performed by the synthesis processing part 7. When the enlarged display of the supplementary image is completed at step S215, processing returns to the original routine.

In enlargement processing of a display image of a face part of an object person, as described above, if the size of the face part is equal to or less than half the size of the display screen, the enlargement speed of 1.1 times is used for one piece of enlargement processing and if the size of the face part is larger than half the size of the display screen, the enlargement speed is made faster. The enlargement speed is made faster with an increasing enlargement ratio because details of the face part in the image become clearly visible with enlargement, and if the face part is enlarged more than necessary, the object person is embarrassed that a flaw of skin becomes visible. When the enlargement ratio becomes large, details of the face part are made inconspicuous by performing processing of the blurring effect. Incidentally, the determination value used at step S206, step S207, or step S208 and the coefficient to multiply the enlargement ratio at step S211 or step S212 may suitably be changed according to design philosophy.

In the second embodiment, as described above, a transitional display from the state in which only an image shot showing an object person is displayed (for example, at timing t1 shown in FIG. 12) through the state in which the image shot showing the object person and a supplementary image are simultaneously displayed (for example, at timing t4 and t5 shown in FIG. 12) to the state in which only the supplementary image is displayed (for example, at timing t6 shown in FIG. 12) is made.

By displaying image shots in combination with supplementary images in this manner, reproduction and display of image shots will not be boring to viewers. For example, photos showing an object person with a smiling face, particularly image shots in which an object person is shot in close-up are difficult for viewers to understand circumstances in which such photos were shot. However, according to the second embodiment, reproduction of circumstances concerning shooting becomes possible with a scheme as described above so that appreciation of reproduction and display such as a slide show can be made more amusing.

Also in the second embodiment, supplementary images are selected based on the shooting time, shooting location and the like of image shots. Therefore, there is no possibility that an image that is totally irrelevant to an image shot is selected as a supplementary image. Moreover, a supplementary image for an image shot concerning a trip can also be acquired from an external database and thus, even if a supplementary image suitable for an image shot is not present in the camera, a suitable supplementary image for an image shot can still be selected.

Further, in the second embodiment, supplementary images are selected after classifying image shots according to shooting time, shooting location or the like and thus, there is no possibility that an image that is totally irrelevant to an image shot is selected.

In the second embodiment, when the display is switched from an image shot to a supplementary image, the image shot is displayed while an object person in the image shot is being gradually enlarged and the contrast being lowered and a supplementary image is caused to display to allow viewers to imagine shooting circumstances.

Further, in the second embodiment, when an image shot is enlarged, the enlargement centers on the face part of an object person in the image shot. Thus, the attention of the viewers is focused on the object person so that switching to a supplementary image appears smooth to the viewers.

Further, in the second embodiment, the enlargement processing speed of an image shot and the degree of blurring of blurring effect processing when the image shot is reproduced are changed in accordance with the size of the face part of an object person. Accordingly, viewers can be prevented from losing interest by the face part being displayed in close-up, in which a flaw of skin such as wrinkles or blotches of an object person is displayed conspicuously.

The second embodiment is described by taking image shots of an object person with a smiling face as an example, but the second embodiment is not limited to this and can naturally be applied to other expressions such as a weeping face. In such a case, the face part detected by the face detection part may be classified into a smiling face, a weeping face and the like to perform selection processing of a supplementary image in accordance with the expression.

The second embodiment is also described by taking a digital camera as an example of an apparatus for shooting, but the camera may be a digital single-lens reflex camera or compact digital camera, or even a camera contained in a mobile phone or personal digital assistant (PDA).

Further, in the second embodiment, a camera performs all processing such as shooting processing, classification processing of image shots, selection processing of supplementary images, and smiling face reproduction processing, but image data acquired by shooting of a camera may be captured by a personal computer or the like so that the personal computer performs classification processing of image shots, selection processing of supplementary images, and smiling face reproduction processing. In such a case, the camera only needs to record date/time information, shooting position information and the like as a file together with image data of image shots.

Further, in addition to being performed by a camera, the transitional display may be made by a display device after a person image and a supplementary image are sequentially transmitted from the camera. Or, the camera may transmit in the order of a person image, a transitional image, and a supplementary image so that a display device that has received these images can make a transitional display.

Further, when a supplementary image is displayed, the technology used to detect and determine each part such as an eye, nose, and mouth in the face part of an object person may be used so that, for example, when it is determined that the object person is not looking forward, image processing is performed on each part to obtain an image shot in which the object person looks forward before the image is displayed as a supplementary image.

In the foregoing, the present invention has been described by taking the first embodiment and the second embodiment as examples, but the present invention is not limited to these embodiments and various alterations and modifications can naturally be made without deviating from the scope thereof.

For example, if a predetermined vibration operation is performed on a digital camera according to the first embodiment, the camera may be configured to transition to the display mode featuring a camera according to the second embodiment as shown in FIG. 14.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. Apparatus comprising:
   an imaging part for capturing a plurality of images responsive to user operation input;
   a storage part which stores the plurality of images;
   a vibration detection part which detects a manual vibration of the apparatus by a user while the apparatus is in a reproduction mode, wherein the manual vibration corresponds to a predefined user input command;
   a switching instruction part which switches to one type of a plurality of different types of reproduction of the plurality of images based on the predefined user input command corresponding to the manual vibration detected by the vibration detection part;
   a synthesis processing part which creates processed images from at least one of the plurality of images based on the type of reproduction switched to by the switching instruction part, wherein the at least one of the plurality of images from which the synthesis processing part creates processed images consist of images automatically specified based on an image classification;
   a tentative storage part for storing the processed images created by the synthesis processing part; and
   a display control part which controls the reproduction of at least some of the created processed images stored in the tentative storage part.

2. The apparatus according to claim 1, wherein creation of the processed images by the synthesis processing part includes synthesizing an image from more than one image of the plurality of images.

3. The apparatus according to claim 1, wherein the switching instruction part instructs the synthesis processing part to prohibit the creation of processed images when the vibration detection part detects a first predefined user input command.

4. The apparatus according to claim 1, wherein the switching instruction part instructs the synthesis processing part to change a type of reproduction of the plurality of images when the vibration detection part detects a first predefined user input command.

5. The apparatus according to claim 1, wherein the predefined user input command is defined by a number of times of vibration to the apparatus in the detected manual vibration.

6. The apparatus of claim 1 wherein the predefined user input command is defined by a vibration time of the detected manual vibration.

7. The apparatus of claim 1 wherein the type of reproduction of the plurality of images switched to includes reproducing at least one synthesized image.

8. The apparatus of claim 1 wherein the type of reproduction of the plurality of images switched to includes reproducing at least one split image.

9. The apparatus of claim 1 wherein the type of reproduction of the plurality of images switched to includes reproducing at least one color processed image.

10. The apparatus of claim 1 wherein the type of reproduction of the plurality of images switched to includes reproducing at least one enlarged image.

11. The apparatus of claim 1 wherein the type of reproduction of the plurality of images switched to includes reproducing at least one reduced image.

12. The apparatus according to claim 1, wherein the manual vibration, detected by the vibration detection part and corresponding to the predefined user input command, occurs after the plurality of images have been stored by the storage part, and
   wherein the plurality of types of reproduction reproduce, on a display of the apparatus, the plurality of images in different ways.

13. The apparatus according to claim 1, further comprising a display on which the reproduction of the at least some of the created processed images stored in the tentative storage part occurs,
   wherein the imaging part, the storage part, the vibration detection part, the switching instruction part, the display control part and the display are all included in a camera.

14. The apparatus according to claim 1, wherein the display control part controls the reproduction of the at least some of the created processed images stored in the tentative storage part so that each of the at least some of the created processed images is displayed for a time which is a function of the number of the at least some of the created processed images, before a next one of the at least some of the created processed images is displayed.

15. A method comprising:
   capturing a plurality of images with a camera responsive to user operation input;
   storing the plurality of images;
   detecting a manual vibration operation of the camera by a user while the camera is in a reproduction mode, wherein the manual vibration corresponds to a predefined user input command;
   switching to one type of a plurality of different types of reproduction of the plurality of images based on the predefined user input command corresponding to the detected manual vibration operation;
   creating processed images from at least one of the plurality of images based on the type of reproduction switched to, wherein the at least one of the plurality of images from which the processed images are created consist of images automatically specified based on an image classification;
   storing the processed images created by the synthesis processing part in a tentative storage part of the camera; and
   displaying at least some of the created processed images stored in the tentative storage part.

16. The method of claim 15 wherein the type of reproduction of the plurality of images switched to includes reproducing at least one synthesized image.

17. The method of claim 15 wherein the type of reproduction of the plurality of images switched to includes reproducing at least one split image.

18. The method of claim 15 wherein the type of reproduction of the plurality of images switched to includes reproducing at least one color processed image.

19. The method of claim 15 wherein the type of reproduction of the plurality of images switched to includes reproducing at least one enlarged image.

20. The method of claim 15 wherein the type of reproduction of the plurality of images switched to includes reproducing at least one reduced image.

21. The method of claim 15, wherein the manual vibration, detected and corresponding to the predefined user input command, occurs after the plurality of images have been stored, and wherein the plurality of types of reproduction reproduce, on a display of the camera, the plurality of images in different ways.

22. A non-transitory storage medium storing program instructions which, when executed by at least one processor of a reproduction apparatus, cause the at least one processor of the reproduction apparatus to perform a method comprising:

capturing a plurality of images with a camera responsive to user operation input;

storing the plurality of images;

detecting a manual vibration operation of the camera by a user while the camera is in a reproduction mode, wherein the manual vibration corresponds to a predefined user input command;

switching to one type of a plurality of different types of reproduction of the plurality of images based on the predefined user input command corresponding to the detected manual vibration operation;

creating processed images from at least one of the plurality of images based on the type of reproduction switched to, wherein the at least one of the plurality of images from which the processed images are created consist of images automatically specified based on an image classification;

storing the processed images created by the synthesis processing part in a tentative storage part of the camera; and displaying at least some of the created processed images stored in the tentative storage part.

23. Apparatus comprising:

an imaging part for capturing a plurality of images responsive to user operation input;

a storage part which stores the plurality of images;

a user operation part for receiving at least one user selection for designating at least some of the plurality of images as candidate images;

a vibration detection part which detects a manual vibration of the reproduction apparatus by a user, wherein the manual vibration corresponds to one of a plurality of different predefined display mode user commands;

a synthesis processing part which creates processed images from at least one of the plurality of images based on the type of reproduction switched to by the switching instruction part, wherein the at least one of the plurality of images from which the synthesis processing part creates processed images consist of images automatically specified based on an image classification; and a display control part which performs a predefined image display mode on the candidate images in accordance with the one of the predefined display mode user commands corresponding to the manual vibration detected by the vibration detection part, and which controls the reproduction of at least some of the processed images created.

24. The reproduction apparatus according to claim 23, wherein the manual vibration, detected by the vibration detection part and corresponding to the predefined display mode user command, occurs after the images have been stored by the storage part.

25. A method comprising:

capturing a plurality of images responsive to user operation input;

storing the plurality of images;

receiving at least one user selection for designating at least some of the plurality of images as candidate images;

detecting a manual vibration operation of the reproduction apparatus by a user, wherein the manual vibration corresponds to one of a plurality of different predefined display mode user commands;

creating processed images from at least one of the plurality of images based on the type of reproduction switched to, wherein the at least one of the plurality of images from which the processed images are created consist of images automatically specified based on an image classification;

displaying at least one of the processed images created; and performing a predefined image display mode on the candidate images in accordance with one of the predefined display mode user commands corresponding to the manual vibration detected.

26. The reproduction method of claim 25, wherein the manual vibration, detected and corresponding to the predefined display mode user command, occurs after the images have been stored.

* * * * *